US012623678B2

(12) United States Patent
Kume et al.

(10) Patent No.: US 12,623,678 B2
(45) Date of Patent: May 12, 2026

(54) VEHICLE CONTROL DEVICE AND VEHICLE CONTROL METHOD

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 28 days.

(21) Appl. No.: 18/668,913

(22) Filed: May 20, 2024

(65) Prior Publication Data

US 2024/0308537 A1    Sep. 19, 2024

Related U.S. Application Data

(63) Continuation of application No. PCT/JP2022/041141, filed on Nov. 4, 2022.

(30) Foreign Application Priority Data

Nov. 22, 2021    (JP) ................................. 2021-189631
Sep. 21, 2022    (JP) ................................. 2022-150582

(51) Int. Cl.
*B60W 50/14*        (2020.01)
*B60W 30/08*        (2012.01)
*B60W 60/00*        (2020.01)

(52) U.S. Cl.
CPC ............ *B60W 50/14* (2013.01); *B60W 30/08* (2013.01); *B60W 60/00133* (2020.02); *B60W*

*2540/215* (2020.02); *B60W 2552/10* (2020.02); *B60W 2554/402* (2020.02)

(58) Field of Classification Search
CPC ........... B60W 50/14; B60W 60/00133; B60W 30/08; B60W 2540/215; B60W 2554/402; B60W 2552/10
See application file for complete search history.

(56) References Cited

U.S. PATENT DOCUMENTS

| | | | |
|---|---|---|---|
| 2017/0158054 A1* | 6/2017 | Munaoka | ............... B60Q 5/005 |
| 2017/0371340 A1 | 12/2017 | Cohen et al. | |
| 2017/0371343 A1 | 12/2017 | Cohen et al. | |
| 2017/0371344 A1 | 12/2017 | Cohen et al. | |
| 2017/0371345 A1 | 12/2017 | Cohen et al. | |
| 2017/0371347 A1 | 12/2017 | Cohen et al. | |

(Continued)

FOREIGN PATENT DOCUMENTS

| | | |
|---|---|---|
| JP | 2013-045233 A | 3/2013 |
| JP | 2016-128997 A | 7/2016 |

(Continued)

*Primary Examiner* — Jay Khandpur
(74) *Attorney, Agent, or Firm* — Harness, Dickey & Pierce, P.L.C.

(57) ABSTRACT

A vehicle control device that performs automatic driving without monitoring obligation is configured to: identity an obstacle which prevents the vehicle from traveling; identify, when the obstacle is identified, an avoidance measure which is a measure that allows the vehicle to avoid the obstacle; and permit, during the automatic driving without monitoring obligation, an avoidance based on a deviant measure on a basis of a fact that the avoidance measure is a deviant measure outside a scope of traffic regulations.

19 Claims, 8 Drawing Sheets

(56)     References Cited

U.S. PATENT DOCUMENTS

| | | | |
|---|---|---|---|
| 2018/0099663 A1* | 4/2018 | Diedrich | B60W 40/072 |
| 2019/0283579 A1 | 9/2019 | Munaoka et al. | |
| 2019/0291727 A1 | 9/2019 | Shalev-Shwartz et al. | |
| 2019/0291728 A1* | 9/2019 | Shalev-Shwartz | B60W 40/06 |
| 2019/0294897 A1 | 9/2019 | Cohen et al. | |
| 2019/0295179 A1 | 9/2019 | Shalev-Shwartz et al. | |
| 2019/0299983 A1 | 10/2019 | Shalev-Shwartz et al. | |
| 2019/0329768 A1 | 10/2019 | Shalev-Shwartz et al. | |
| 2019/0329769 A1 | 10/2019 | Shalev-Shwartz et al. | |
| 2019/0329773 A1 | 10/2019 | Shalev-Shwartz et al. | |
| 2019/0329782 A1 | 10/2019 | Shalev-Shwartz et al. | |
| 2019/0329783 A1 | 10/2019 | Shalev-Shwartz et al. | |
| 2019/0333381 A1 | 10/2019 | Shalev-Shwartz et al. | |
| 2021/0056327 A1 | 2/2021 | Cohen et al. | |
| 2021/0110483 A1 | 4/2021 | Shalev-Shwartz et al. | |
| 2021/0110484 A1 | 4/2021 | Shalev-Shwartz et al. | |
| 2021/0142421 A1 | 5/2021 | Shalev-Shwartz et al. | |
| 2021/0166325 A1 | 6/2021 | Shalev-Shwartz et al. | |
| 2021/0188356 A1* | 6/2021 | Goto | B62D 6/00 |
| 2021/0269021 A1 | 9/2021 | Shalev-Shwartz et al. | |
| 2022/0363248 A1 | 11/2022 | Shalev-Shwartz et al. | |
| 2023/0347877 A1 | 11/2023 | Shalev-Shwartz et al. | |

FOREIGN PATENT DOCUMENTS

| | | | |
|---|---|---|---|
| JP | 2017178131 A | 10/2017 |
| JP | 2017224163 A | 12/2017 |
| JP | 201884873 A | 5/2018 |
| JP | 2019101453 A | 6/2019 |
| JP | 6593486 B2 | 10/2019 |
| JP | 2020516971 A | 6/2020 |

* cited by examiner

1

VEHICLE CONTROL DEVICE AND VEHICLE CONTROL METHOD

CROSS REFERENCE TO RELATED APPLICATION

The present application is a continuation application of International Patent Application No. PCT/JP2022/041141 filed on Nov. 4, 2022 which designated the U.S. and claims the benefit of priority from Japanese Patent Application No. 2021-189631 filed on Nov. 22, 2021 and Japanese Patent Application No. 2022-150582 filed on Sep. 21, 2022. The entire disclosures of all of the above applications are incorporated herein by reference.

TECHNICAL FIELD

The present disclosure relates to a vehicle control device and vehicle control method.

BACKGROUND

A related art discloses an automatic driving control unit including Level-1 to Level-5 automatic driving functions in addition to a Level-0 manual driving function.

SUMMARY

A vehicle control device that performs automatic driving without monitoring obligation is configured to: identity an obstacle which prevents the vehicle from traveling; identify, when the obstacle is identified, an avoidance measure which is a measure that allows the vehicle to avoid the obstacle; and permit, during the automatic driving without monitoring obligation, an avoidance based on a deviant measure on a basis of a fact that the avoidance measure is a deviant measure outside a scope of traffic regulations.

DETAILED DESCRIPTION

Figure 1:
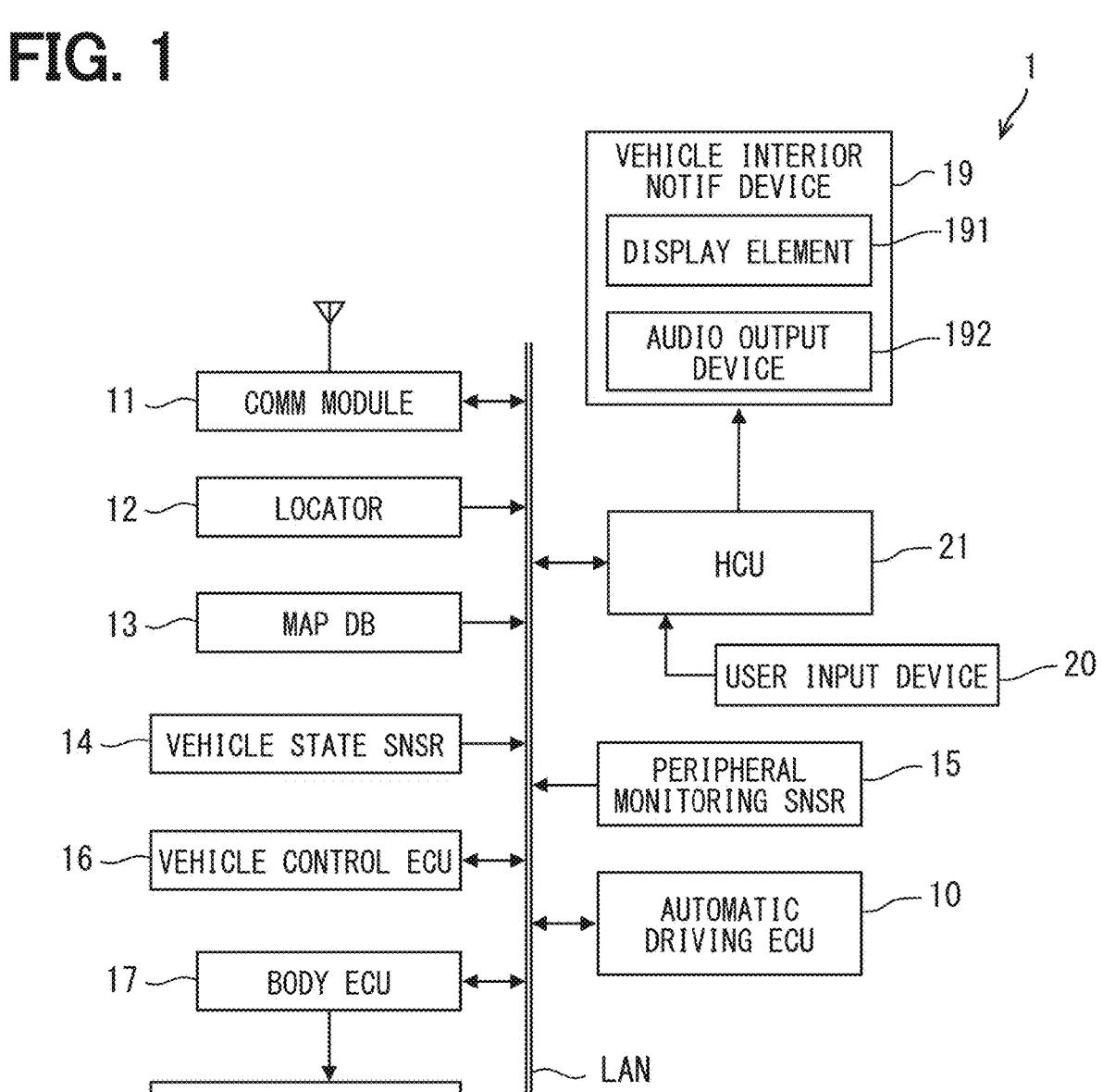
FIG. 1 is a diagram illustrating an example of a schematic configuration of a vehicle system.

Examples of known automation levels include automation levels defined by SAE, which are classified as Levels 0 to 5. Level 0 is a level at which a driver performs all driving tasks without system intervention. Level 0 corresponds to so-called manual driving. Level 1 is a level at which a system assists either steering or acceleration/deceleration. Level 2 is a level at which the system assists each of the steering and the acceleration/deceleration. Automatic driving at Levels 1-2 is automatic driving during which the driver has a monitoring obligation related to safe driving (hereinafter referred to simply as the monitoring obligation). Level 3 is a level at which the system can perform all the driving tasks at a specified place such as an expressway. Level 4 is a level at which the system can perform all the driving tasks except under a specified situation such as an unsupported road or an ultimate environment. Level 5 is a level at which the system can perform all the driving tasks under any environment. Automatic driving at Level 3 or higher is the automatic driving during which the driver does not have the monitoring obligation. Automatic driving at Level 4 or higher is the automatic driving during which the driver is permitted to sleep.

A related art discloses a technology to perform automatic driving at high automation levels such as automatic driving during which a driver does not have a monitoring obligation or automatic driving during which the driver is permitted to sleep, but does not assume a case where it is difficult to avoid an obstacle by adopting a behavior within traffic regulations. As a result, with the technology disclosed in a related art, it may be difficult to automatically avoid an obstacle when the obstacle is to be avoided during automatic driving and when it is difficult to avoid the obstacle by adopting a behavior within traffic regulations. Thus, there may be a situation in which it is not preferable to continue automatic driving excessively bound by traffic regulations or traffic manners.

The present disclosure provides a vehicle control device and a vehicle control method which allow, when it is not preferable to drive within the scope of traffic regulations or traffic manners during automatic driving, driving outside the scope of the traffic regulations or traffic manners.

According to one aspect of the present disclosure, a vehicle control device used in a vehicle that performs automatic driving without monitoring obligation, which is automatic driving without peripheral monitoring obligation, is provided. The vehicle control device includes: an obstacle identification unit that is configured to identity an obstacle which prevents the vehicle from traveling; an avoidance measure identification unit that is configured to identify, when the obstacle is identified by the obstacle identification unit, an avoidance measure which is a measure that allows the vehicle to avoid the obstacle; and a first permission unit that is configured to permit, during the automatic driving without monitoring obligation, an avoidance based on a deviant measure on a basis of a fact that the avoidance measure identified by the avoidance measure identification unit is a deviant measure outside a scope of traffic regulations.

According to one aspect of the present disclosure, a vehicle control device used on in a vehicle that performs automatic driving without monitoring obligation, which is automatic driving without peripheral monitoring obligation, is provided. The vehicle control device includes: a target situation identification unit that is configured to identify a target situation in which it is set in advance that, during the automatic driving without monitoring obligation, the vehicle preferably performs deviant driving which is driving outside a scope of traffic regulations or traffic manners; and a second permission unit that is configured to permit, during the automatic driving without monitoring obligation, when the target situation is identified by a target situation dentification unit, the deviant driving according to the target situation.

In the configuration described above, even when the avoidance measure that allows the obstacle preventing the vehicle from traveling is the deviant measure outside the scope of the traffic regulations, the avoidance based on the deviant measure is allowed. Consequently, when it is not preferable to drive within the scope of the traffic regulations or traffic manners during automatic driving, it is possible to drive outside the scope of the traffic regulations or traffic manners. In addition, even when it is necessary to avoid an obstacle during automatic driving and the avoidance is difficult by adopting a behavior within the traffic regulations, it is possible to allow the obstacle to be more smoothly avoided automatically.

According to one aspect of the present disclosure, a vehicle control method usable in a vehicle that performs automatic driving without monitoring obligation, which is automatic driving without peripheral monitoring obligation, is provided. The vehicle control method includes steps to be performed by at least one processor, the steps being: an obstacle identification step of identifying an obstacle which prevents the vehicle from traveling; an avoidance measure identification step of identifying, when the obstacle is identified in the obstacle identification step, an avoidance measure which is a measure that allows the vehicle to avoid the obstacle; and a first permission step of permitting, during the automatic driving without the monitoring obligation, on a basis of a fact that the avoidance measure identified in the avoidance measure identification step is a deviant measure outside a scope of traffic regulations, avoidance based on the deviant measure.

According to one aspect of the present disclosure, a vehicle control method usable in a vehicle that performs automatic driving without monitoring obligation, which is automatic driving without peripheral monitoring obligation, the vehicle control method includes steps to be performed by at least one processor, the steps being: a target situation identification step of identifying a target situation in which it is set in advance that, during the automatic driving without monitoring obligation, the vehicle preferably performs deviant driving which is driving outside a scope of traffic regulations or traffic manners; and a second permission step of permitting, during the automatic driving without monitoring obligation, when the target situation is identified in the target situation identification step, the deviant driving according to the target situation.

With the foregoing configuration, in a case of a situation in which it is preferable for the vehicle to perform the deviant driving, which is driving outside the scope of the traffic regulations or traffic manners, even during the automatic driving without monitoring obligation, it is possible to perform the deviant driving. Consequently, when it is not preferable to drive within the scope of the traffic regulations or traffic manners during automatic driving, it is possible to drive outside the scope of the traffic regulations or traffic manners.

A plurality of embodiments will be described with reference to the drawings. For convenience of description, any part functioning identically to a part depicted in any figure having been referred to in foregoing description will be denoted by an identical reference symbol and may not be described repeatedly in the following embodiments. For the elements denoted by the same reference symbols, the description thereof may be referred to in other embodiments.

First Embodiment

<Schematic Configuration of Vehicle System 1>

Using the drawings, a description will be given below of the first embodiment of the present disclosure. A vehicle system 1 illustrated in FIG. 1 can be used in a vehicle (hereinafter referred to as the automatic driving vehicle) capable of automatic driving. As illustrated in FIG. 1, the vehicle system 1 includes an automatic driving ECU 10, a communication module 11, a locator 12, a map database (hereinafter referred to as the map DB) 13, a vehicle state sensor 14, a peripheral monitoring sensor 15, a vehicle control ECU 16, a body ECU 17, a direction indicator 18, an vehicle interior notification device 19, a user input device 20, and a HCU (Human Machine Interface Control Unit) 21. For example, the automatic driving ECU 10, the communication module 11, the locator 12, the map DB 13, the vehicle state sensor 14, the peripheral monitoring sensor 15, the vehicle control ECU 16, the body ECU 17, and the HCU 21 may appropriately be configured to be connected to an in-vehicle LAN (see LAN in FIG. 1). A vehicle using the vehicle system 1 is not necessarily limited to an automobile but, by way of example, a description will be given below of a case where the vehicle system 1 is used in an automobile.

As levels of automatic driving of an automatic driving vehicle (hereinafter referred to as the automation levels), there may be a plurality of levels as defined by, e.g., SAE. The automation levels are classified as, e.g., LV0 to LV5 as shown below.

LV0 is a level at which a driver performs all driving tasks without system intervention. The driving tasks may be referred to also as dynamic driving tasks. It is assumed that the driving tasks are, e.g., steering, acceleration/deceleration, and peripheral monitoring. LV0 corresponds to so-called manual driving. LV1 is a level at which a system assists either the steering or the acceleration/deceleration. LV1 corresponds to so-called drive assist. LV2 is a level at which the system assists each of the steering and the acceleration/deceleration. LV2 corresponds to so-called partial driving automation. It is assumed that LV1-LV2 are also parts of the automatic driving.

For example, it is assumed that LV1-LV2 automatic driving is automatic driving during which a driver has a monitoring obligation related to safe driving (hereinafter referred to simply as the monitoring obligation). In other words, the LV1 to LV2 automatic driving corresponds to the automatic driving with monitoring obligation. As the monitoring obligation, there is visual peripheral monitoring. The LV1-LV2 automatic driving can be referred to also as automatic driving during which a second task is not permitted. The second task is an activity other than driving which is permitted for the driver, and is a specified activity prescribed in advance. The second task can be referred to also as a secondary activity, another activity, or the like. It is assumed that the second task should not prevent the driver from responding to a driving operation takeover request from the automatic driving system. By way of example, an activity such as viewing of a content such as a video, an operation on a smartphone or the like, reading, or dining is assumed to be the second task.

LV3 automatic driving is at a level at which the system can perform all the driving tasks under specified conditions and the driver performs a driving operation during an emergency. In the LV3 automatic driving, when there is a drive change request from the system, the driver is required to make a quick response. The drive change can be referred to also as a transfer of the peripheral monitoring obligation from the vehicle-side system to the driver. The LV3 corresponds to so-called conditional driving automation. As the LV3, there is an area-limited LV3 limited to a specified area. The specified area mentioned herein may appropriately be an expressway. The specified area may also be, e.g., a specified lane. The LV3 also includes a congestion-limited LV3 limited to times of congestion. The congestion-limited LV3 may also be configured appropriately to be limited to, e.g., times of congestion in an expressway. Expressways may also include a motorway.

LV4 automatic driving is at a level at which the system can perform all the driving tasks except under a specified situation such as an unsupported road or an ultimate environment. The LV4 corresponding to so-called advanced driving automation. LV5 automatic driving is at a level at which the system can perform all the driving tasks under any environment. The LV5 corresponds to so-called complete driving automation. The LV4/LV5 automatic driving may appropriately be performed in a traveling section in which, e.g., high-accuracy map data is prepared. A description will be given later of the high-accuracy map data.

For example, it is assumed that the LV3-LV5 automatic driving is automatic driving during which the driver does not have the monitoring obligation. In other words, the LV3-LV5 automatic driving corresponds to automatic driving without monitoring obligation. The LV3-LV5 automatic driving can be referred to also as automatic driving during which the second task is permitted. Of the LV3-LV5 automatic driving, the automatic driving at LV4 or higher corresponds to automatic driving during which the driver is permitted to sleep. In other words, automatic driving at LV4 or higher corresponds to sleep-permitted automatic driving. The automatic driving at LV4 or higher can be referred to also as automatic driving which does not require a drive change to the driver even during an emergency. Of the LV3-LV5 automatic driving, the Level-3 automatic driving corresponds to automatic driving during which the driver is not permitted to sleep (hereinafter referred to as sleep-unpermitted automatic driving). It is assumed that the automatic driving vehicle in the present mode is switchable between the automation levels. The automatic driving vehicle may also be configured to be switchable between some of the levels LV0-LV5. It is assumed that the automatic driving vehicle in the present embodiment can perform at least the automatic driving without monitoring obligation.

The communication module 11 performs information transmission/reception to/from a center outside a host vehicle via wireless communication. In other words, wide-range communication is performed. The communication module 11 receives congestion information or the like from the center by the wide-range communication. The communication module 11 may also perform information transmission/reception to/from another vehicle via the wireless communication. In other words, vehicle-to-vehicle communication may also be performed. The communication module 11 may also perform information transmission/reception to/from a road-side machine placed on a road side via the wireless communication. In other words, road-to-vehicle communication may also be performed. When performing the road-to-vehicle communication, the communication module 11 may also receive information on a peripheral vehicle around the host vehicle which is transmitted from the peripheral vehicle via the road-side machine. Alternatively, the communication module 11 may also receive information on the peripheral vehicle around the host vehicle which is transmitted from the peripheral vehicle via the center.

The locator 12 includes a GNSS (Global Navigation Satellite System) receiver and an inertial sensor. The GNSS receiver receives positioning signals from a plurality of positioning satellites. The inertial sensor includes, e.g., a gyro sensor and an acceleration sensor. The locator 12 combines the positioning signals received by the GNSS receiver with a result of measurement from the inertial sensor to sequentially position a vehicle position of the host vehicle (hereinafter referred to as the host vehicle position) in which the locator 12 is mounted. The host vehicle position may appropriately be represented by, e.g., latitude/longitude coordinates. For the positioning of the host vehicle position, a configuration using also a travel distance obtained from signals sequentially output from a vehicle speed sensor, which is mounted in the vehicle and described later, may also be used.

The map DB 13 is a nonvolatile memory storing therein the high-accuracy map data. The high-accuracy map data is map data higher in accuracy than map data used for route guidance provided by a navigation function. In the map DB 13, the map data used for the route guidance may also be stored. The high-accuracy map data includes information usable for automatic driving such as, e.g., three-dimensional shape information of roads, lane number information, and information indicating a direction of travel permitted for each of lanes. Besides, the high-accuracy map data may also include information on, e.g., node points indicating both end positions for road markings such as demarcation lines. Note that the locator 12 may also have a configuration which does not use the GNSS receiver by using the three-dimensional shape information of the roads. For example, the locator 12 may also be configured to use the three-dimensional shape information of the roads and a detection result from the peripheral monitoring sensor 15 such as a LIDAR (Light Detection and Ranging/Laser Imaging Detection and Ranging) which detects a set of feature points of road shapes and structures or a peripheral monitoring camera to specify the host vehicle position. The three-dimensional shape information of the roads may also be generated by REM (Road Experience Management) on the basis of captured images.

It may also be possible to receive map data delivered from an external server by the wide range communication via the communication module 11 and store the map data in the map DB 13. In this case, it may also be possible to use a configuration in which a nonvolatile memory is used as the map DB 13, and the communication module 11 sequentially acquires map data of a region according to the host vehicle position.

The vehicle state sensor 14 is a group of sensors for detecting various states of the host vehicle. The vehicle state sensor 14 includes the vehicle speed sensor and the like. The vehicle speed sensor detects a speed of the host vehicle. The vehicle state sensor 14 outputs detected sensing information to the in-vehicle LAN. It may also be possible to use a configuration in which the sensing information detected by the vehicle state sensor 14 is output to the in-vehicle LAN via an ECU mounted in the host vehicle.

The peripheral monitoring sensor 15 monitors a peripheral environment of the host vehicle. By way of example, the peripheral monitoring sensor 15 detects an obstacle around the host vehicle, such as a moving object such as a pedestrian or another vehicle or a stationary object such as a fallen object on a road. Besides, road markings around the host vehicle, such as a lane demarcation line, are detected. For example, the peripheral monitoring sensor 15 is the peripheral monitoring camera that captures images of a predetermined range around the host vehicle or a sensor that transmits a probing wave to the predetermined range around the host vehicle, such as a millimeter wave radar, a sonar, or the LIDAR. The predetermined range may also be a range partially including at least front, rear, left, and right sides of the host vehicle. The peripheral monitoring camera sequentially outputs images sequentially captured as the sensing information to the automatic driving ECU 10. The sensor that transmits the probing wave such as the sonar, the millimeter wave radar, or the LIDAR sequentially outputs, as the sensing information, a result of scanning based on a reception signal obtained when a reflection wave resulting from reflection by the obstacle is received to the automatic driving ECU 10. It may also be possible to use a configuration in which the sensing information detected by the peripheral monitoring sensor 15 is output to the automatic driving ECU 10 without interposition of the in-vehicle LAN.

The vehicle control ECU 16 is an electronic control device that controls driving of the host vehicle. As the driving control, acceleration/deceleration control and/or steering control can be listed. The vehicle control ECU 16 includes a steering ECU that controls steering, a power unit control ECU and a brake ECU which control the acceleration/deceleration, and the like. The vehicle control ECU 16 controls driving by outputting a control signal to each of driving control devices mounted in the host vehicle, such as an electronic control throttle, a brake actuator, and an EPS (Electric Power Steering) motor.

The body ECU 17 is an electronic control device that controls electrical components of the host vehicle. The body ECU 17 controls the direction indicator 18 of the host vehicle. The direction indicator 18 is referred to also as a turn signal lamp, a turn lamp, or a blinker lamp. The direction indicator 18 is provided on each of right and left sides of the host vehicle. Lighting of only one of the left and right direction indicators 18 serves as a sign representing a change of direction of the host vehicle. Lighting of both of the left and right direction indicators 18 corresponds to a hazard lamp, which serves as a sign representing an emergency. The direction indicators 18 correspond to a vehicle exterior notification device that makes a notification to the outside of the vehicle.

The vehicle interior notification device 19 makes a notification to the vehicle interior of the host vehicle. The vehicle interior notification device 19 includes a display element 191 and an audio output device 192. The display element 191 displays information to present the information. The display element 191 presents information according to an instruction from the HCU 21. As the display element 191, e.g., a meter MID (Multi Information Display), a CID (Center Information Display), or a HUD (Head-Up Display) can be used.

The meter MID is a display device provided in front of a driver seat in the vehicle interior. By way of example, the meter MID may appropriately be configured to be provided in a meter panel. The CID is a display device disposed at a center of an instrument panel of the host vehicle. The HUD is provided in, e.g., an instrument panel in the vehicle interior. The HUD projects a display image formed by a projector onto a projection region already defined in a front window shield serving as a projection member. Light from an image reflected by the front window shield onto a vehicle interior side is perceived by a driver occupying the driver seat. This allows the driver to visually recognize a virtual image of the display image formed in front of the front window shield in superimposed relation to a part of a front view. The HUD may also be configured to project the display image on, instead of the front window shield, a combiner provided in front of the driver seat.

The audio output device 192 outputs a sound to present information. As the audio output device 192, there can be listed a speaker provided in the vehicle interior of the host vehicle or the like.

The user input device 20 receives an input from the user. The user input device 20 may appropriately be an operation device that receives an operation input thereto from the user. The operation device may be a mechanical switch or a touch switch integrated with a display. Note that the user input device 20 is not limited to the operation device that receives the operation input thereto as long as the user input device 20 is a device that receives an input from the user. For example, the user input device 20 may also be an audio input device that receives an audio command input thereto from the user.

The HCU 21 is configured to mainly include a computer including a processor, a volatile memory, a nonvolatile memory, an I/O, and a bus providing connection therebetween. The HCU 21 executes a control program stored in the nonvolatile memory to perform various processing related to communication between a vehicle passenger and a system of the host vehicle. The HCU 21 receives an input from the passenger such as the driver of the host vehicle via the user input device 20. The HCU 21 controls a notification made by the vehicle interior notification device 19.

The automatic driving ECU 10 is configured to mainly include a computer including a processor, a nonvolatile memory, a nonvolatile memory, an I/O, and a bus providing connection therebetween. The automatic driving ECU 10 executes a control program stored in the nonvolatile memory to perform processing related to automatic driving. The automatic driving ECU 10 corresponds to a vehicle control device. In the present embodiment, it is assumed that the automatic driving ECU 10 is used in at least a vehicle capable of performing automatic driving without monitoring obligation. Note that a detailed description will be given below of a configuration of the automatic driving ECU 10.
<Schematic Configuration of Automatic Driving ECU 10>

Figure 2:
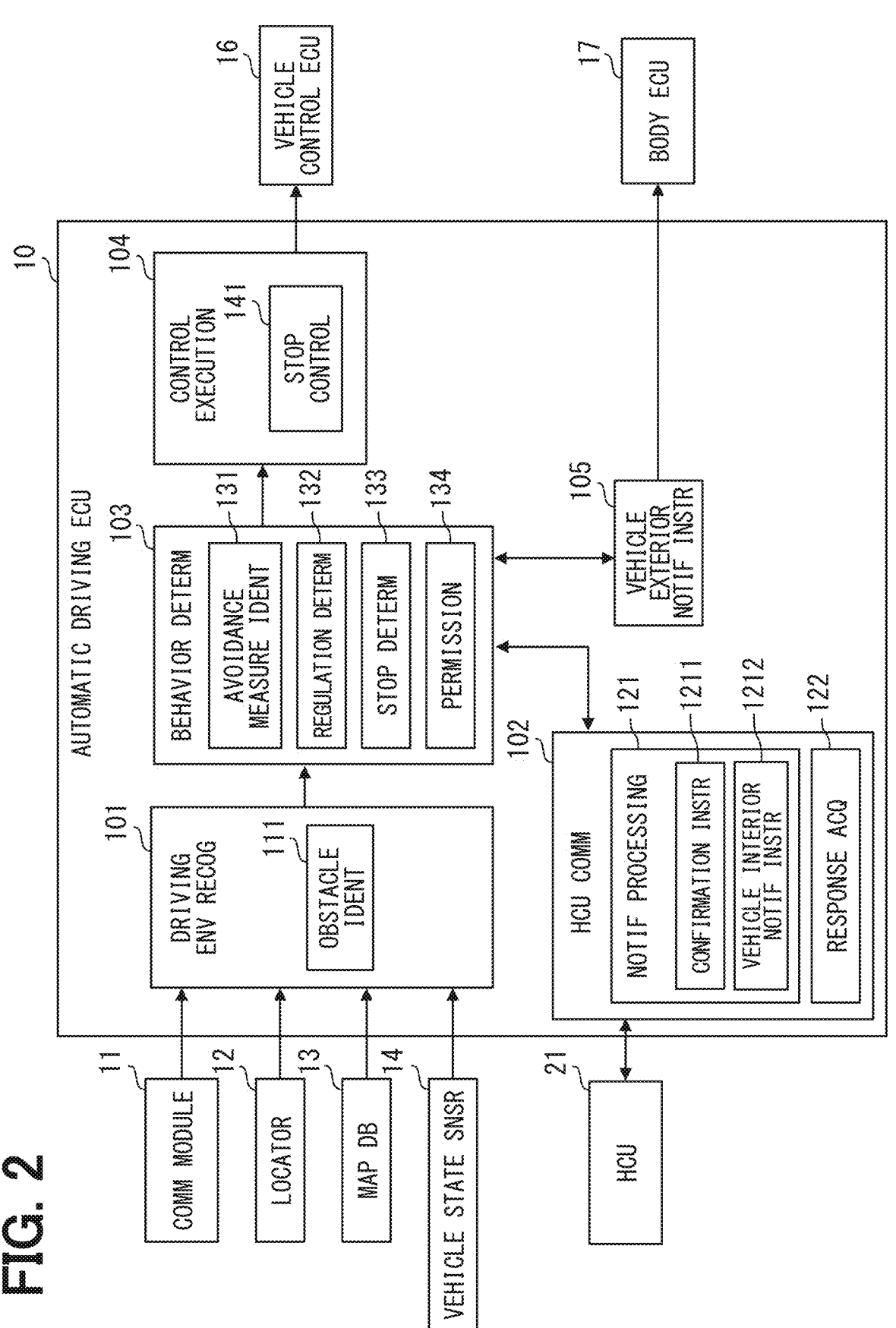
FIG. 2 is a diagram illustrating an example of a schematic configuration of an automatic driving ECU.

Subsequently, using FIG. 2, a description will be given of a schematic configuration of the automatic driving ECU 10. As illustrated in FIG. 2, the automatic driving ECU 10 includes a driving environment recognition unit 101, a HCU communication unit 102, a behavior determination unit 103, a control execution unit 104, and a vehicle-exterior-notification instruction unit 105 as functional blocks. In addition, execution of processing in each of the functional blocks of the automatic driving ECU 10 by the computer corresponds to implementation of a vehicle control method. Note that some or all of functions performed by the automatic driving ECU 10 may also be configured as hardware by using one or a plurality of ICs or the like. Alternatively, some or all of the functional blocks included in the automatic driving ECU 10 may also be implemented by a combination of execution of software by a processor and a hardware member.

The driving environment recognition unit 101 recognizes a driving environment of the host vehicle from the host vehicle position acquired from the locator 12, the map data acquired from the map DB 13, and the sensing information acquired from the peripheral monitoring sensor 15. The driving environment recognition unit 101 corresponds to a driving environment identification unit. By way of example, the driving environment recognition unit 101 uses these information items to recognize a position, a shape, and a movement state of an object around the host vehicle and generate a virtual space that reproduces a real driving environment.

The driving environment recognition unit 101 may appropriately recognize, from the sensing information acquired from the peripheral monitoring sensor 15, the presence of each of a peripheral vehicle and a pedestrian around the host vehicle, a relative position thereof with respect to the host vehicle, a relative speed thereof with respect to the host vehicle, and the like as a driving environment. The peripheral vehicle may appropriately be a vehicle under traffic regulations around the host vehicle. For example, the peripheral vehicle may appropriately be allowed to include not only an automobile, but also a motorcycle, a motorized bicycle, a bicycle, and the like. The pedestrian may appropriately be a pedestrian under the traffic regulations. For example, the pedestrian may appropriately be allowed to include an electric wheelchair. The driving environment recognition unit 101 may appropriately recognize the host vehicle position on a map on the basis of the host vehicle position and the map data. When it is possible to acquire position information, speed information, and the like of the peripheral vehicle or the like via the communication module 11, the driving environment recognition unit 101 may appropriately recognize the driving environment by also using these information items.

The driving environment recognition unit 101 includes an obstacle identification unit 111 as a sub-functional block. The obstacle identification unit 111 identifies an obstacle that prevents the host vehicle from traveling. Processing in the obstacle identification unit 111 corresponds to an obstacle identification step. As the obstacle that prevents the host vehicle from traveling, which is identified by the obstacle identification unit 111, there can be listed a driving-ahead vehicle that has rapidly decelerated, a side vehicle that has pulled over, a fallen object on a road, or the like. Note that the obstacle that prevents the host vehicle from traveling, which is identified by the obstacle identification unit 111, is not limited to a three-dimensional object. For example, a sagging portion of a road surface, a frozen portion of the road surface, an oil spill portion of the road surface, or the like can also be regarded as a target. A portion without unevenness, such as the oil spill portion, may appropriately be identified on the basis of a brightness in a captured image or the like.

The driving environment recognition unit 101 may also perform determination of a manual driving area (hereinafter referred to as the MD area) of a traveling region of the host vehicle as appropriate. The driving environment recognition unit 101 may also perform determination of an automatic driving area (hereinafter referred to as the AD area) of the traveling region of the host vehicle. The driving environment recognition unit 101 may also perform discrimination between a ST section and a non-ST section in the AD area, which will be described later.

The MD area is an area where automatic driving is prohibited. In other words, the MD area is an area where it is prescribed that all of control of the host vehicle in a vertical direction, control thereof in a lateral direction, and the peripheral monitoring are to be executed by the driver. The vertical direction is a direction matching a front-rear direction of the host vehicle. The lateral direction is a direction matching a width direction of the host vehicle. The control in the vertical direction corresponds to acceleration/deceleration control of the vehicle. The control in the lateral direction corresponds to steering control of the host vehicle. For example, the MD area may appropriately be a general road. The MD area may also be a traveling section of the general road in which the high-accuracy map data is not prepared.

The AD area is an area where automatic driving is permitted. In other words, the AD area is an area defined such that the host vehicle can perform at least one of the control in the vertical direction, the control in the lateral direction, and the peripheral monitoring as a substitute. For example, the AD area may appropriately be an expressway. The AD area may also be a traveling section in which the high-accuracy map data is prepared. For example, area-limited LV3 automatic driving may appropriately be permitted only on the expressway. It is assumed that congestion-limited LV3 automatic driving is permitted only during a congestion in the AD area.

The AD area is categorized into the ST section and the non-ST section.

The ST section is a section in which the area-limited LV3 automatic driving (hereinafter referred to as the area-limited automatic driving) is permitted. The non-ST section is a section in which automatic driving at LV2 or lower and the congestion-limited LV3 automatic driving are allowed. In the present embodiment, it is assumed that the non-ST section in which LV1 automatic driving is permitted and the non-ST section in which LV2 automatic driving is permitted are not separate categories. The non-ST section may appropriately be a section of the AD area which does not correspond to the ST section.

The HCU communication unit 102 performs processing of outputting information to the HCU 21 and processing of acquiring information from the HCU 21. The HCU communication unit 102 includes a notification processing unit 121 and a response acquisition unit 122 as sub-functional blocks. The notification processing unit 121 indirectly controls a notification from the vehicle interior notification device 19. The notification processing unit 121 includes a confirmation instruction unit 1211 and a vehicle-interior-notification instruction unit 1212 as sub-functional blocks. A description will be given later of processing in the confirmation instruction unit 1211, the vehicle-interior-notification instruction unit 1212, and the response acquisition unit 122.

The behavior determination unit 103 switches a driving operation control entity between the driver and the system of the host vehicle. When a system side has a right to control a driving operation, the behavior determination unit 103 determines a traveling plan for traveling the host vehicle on the basis of a result of recognition of a driving environment by the driving environment recognition unit 101. As the traveling plan, a long/intermediate-term traveling plan and a short-term traveling plan are generated. In the long/intermediate-term traveling plan, a route for directing the host vehicle to a set destination is generated. This route is a route including a plurality of links. The automatic driving ECU 10 may appropriately generate this route in the same manner as in a route search of the navigation function. This route search may appropriately be performed on the basis of cost calculation using, e.g., a Dijkstra method.

In the short-term traveling plan, the behavior determination unit 103 uses a generated virtual space around the host vehicle to generate a scheduled traveling path for implementing traveling according to the long/intermediate-term traveling plan. Specifically, the behavior determination unit 103 determines execution of steering for a lane change, acceleration/deceleration for speed adjustment, steering for avoiding an obstacle, braking, or the like.

Additionally, the behavior determination unit 103 changes the automation level of automatic driving by the host vehicle as necessary. The behavior determination unit 103 determines whether or not it is possible to increase the automation level. For example, when the host vehicle moves from the MD area to the AD area, the behavior determination unit 103 may appropriately determine that a shift from LV4 or lower driving to LV4 or higher automatic driving is possible. When determining that it is possible to increase the automation level and when receiving an approval of an increase in the automation level from the driver, the behavior determination unit 103 may appropriately increase the automation level.

When determining that a reduction in the automation level is necessary, the behavior determination unit 103 may appropriately reduce the automation level. As a case where it is determined that the reduction in the automation level is necessary, a case where an override is detected, a case where a planned drive change is made, a case when an unplanned drive change is made, or the like can be listed. The override is an operation for the driver of the host vehicle to voluntarily acquire a right to control the host vehicle. In other words, the override is an operational intervention by the driver of the vehicle. As an override operation, a steering wheel operation, depression of an acceleration pedal, depression of a brake pedal, or the like can be listed. The planned drive change is a scheduled drive change based on a determination by the system. By of example, it may appropriately be determined to make a change from the automatic driving at LV4 or higher to LV3 automatic driving at the time of a shift from the traveling section of the AD area in which the high-accuracy map data is prepared to a driving section of the AD area in which the high-accuracy map data is not prepared. The unplanned drive change is an unscheduled abrupt drive change based on a determination by the system.

The behavior determination unit 103 includes an avoidance measure identification unit 131, a regulation determination unit 132, a stop determination unit 133, and a permission unit 134 as sub-functional blocks.

When an obstacle is identified by the obstacle identification unit 111, the avoidance measure identification unit 131 identifies a measure (hereinafter referred to as the avoidance measure) to allow the host vehicle to avoid the obstacle. When an obstacle is identified by the obstacle identification unit 111, the avoidance measure identification unit 131 identifies a route (hereinafter referred to as the avoidance route) corresponding to the scheduled traveling path for the host vehicle that allows the obstacle to be avoided as the avoidance measure. Processing in the avoidance measure identification unit 131 corresponds to an avoidance measure identification step. The avoidance measure identification unit 131 may appropriately identify the avoidance route on the basis of a result of recognition of the driving environment by the driving environment recognition unit 101.

The regulation determination unit 132 determines whether or not the avoidance measure identified by the avoidance measure identification unit 131 is a deviant measure outside the scope of the traffic regulations or traffic manners. Examples of the traffic manners include ensuring a sufficient inter-vehicle distance between the host vehicle and a vehicle driving ahead. The sufficient inter-vehicle distance mentioned herein may appropriately be a distance estimated to be unlikely to give a feeling of pressure to the driving-ahead vehicle, which is set in advance. This distance may also be varied according to a vehicle speed of the host vehicle. The regulation determination unit 132 may appropriately determine whether or not the avoidance route identified by the avoidance measure identification unit 131 is a non-legal route outside the scope of the traffic regulations. The regulation determination unit 132 may appropriately determine whether or not the avoidance route is the non-legal route on the basis of whether or not the avoidance route passes by the vehicle is prohibited in principle under the traffic regulations (hereinafter referred to as the prohibited region). The prohibited region may appropriately be an opposing lane, a road edge demarcated by a road outer line, a road edge of an expressway, or the like. When the prohibited region varies depending on the automation level of the host vehicle, the regulation determination unit 132 may appropriately determine whether or not the avoidance route is the non-legal route on the basis of whether or not the avoidance route passes through the prohibited region according to the automation level of the host vehicle. By way of example, the following may be performed appropriately. When the automation level is LV4 or higher, a lane which is adjacent to a host vehicle lane and in the same direction of travel as that in the host vehicle lane is not regarded as the prohibited region. Meanwhile, when the automation level is LV3, a lane which is adjacent to the host vehicle lane and in the same direction of travel as that in the host vehicle lane is also regarded as the prohibited region.

When it is determined by the regulation determination unit 132 that the avoidance route is the non-legal route, the stop determination unit 133 determines whether or not the host vehicle is allowed to temporarily stop. The temporary stop mentioned herein may also be, e.g., a temporary stop with a margin. "With a margin" indicates having a sufficient inter-vehicle distance to the following car. For example, when a vehicle following the host vehicle is not detected by the peripheral monitoring sensor 15, the stop determination unit 133 may appropriately determine that the temporary stop is allowed. The stop determination unit 133 may appropriately determine that the temporary stop is not allowed when a vehicle following the host vehicle is detected by the peripheral monitoring sensor 15. Even though a vehicle following the host vehicle is detected by the peripheral monitoring sensor 15, when it is estimated that the following vehicle can stop following the temporary stop of the host vehicle, the stop determination unit 133 may also determine that the temporary stop is allowed. This determination may appropriately be made on the basis of the distance between the host vehicle and the following vehicle, a relative speed of the following vehicle with respect to the host vehicle, or the like.

The confirmation instruction unit 1211 of the HCU communication unit 102 causes an inquiry to be made to the driver of the vehicle about whether or not the driver approves evasion to the non-legal route (hereinafter referred to as the evasion approval/disapproval) when the avoidance route identified by the avoidance measure identification unit 131 is the non-legal route and when the host vehicle can temporarily stop. Whether or not the avoidance route is the non-legal route may be determined appropriately by the regulation determination unit 132. Whether or not the host vehicle can temporarily stop may be determined appropriately by the stop determination unit 133. The confirmation instruction unit 1211 may appropriately cause an inquiry about the evasion approval/disapproval to be made by outputting an instruction to make an inquiry about the evasion approval/disapproval (hereinafter referred to as the approval/disapproval inquiry instruction) to the HCU 21.

Note that the confirmation instruction unit 1211 may cause the inquiry about the evasion approval/disapproval to be started after the temporary stop of the host vehicle or started before the temporary stop of the host vehicle. For smooth automatic avoidance of the obstacle, the confirmation instruction unit 1211 preferably starts the evasion approval/disapproval inquiry before the temporary stop of the host vehicle.

The HCU 21 that has received the approval/disapproval inquiry causes the vehicle interior notification device 19 to make a notification (hereinafter referred to as the evasion approval/disapproval notification) inquiring whether or not to approve evasion. The evasion approval/disapproval notification may be made by display on the display element 191 or by an audio output from the audio output device 192. For example, the evasion approval/disapproval notification may appropriately be display of a text or an audio output confirming whether or not it is permitted to pass through a route outside the scope of the traffic regulations in order to avoid the obstacle. In a case where the host vehicle is performing the automatic driving without monitoring obligation, the driver may be concentrated on the second task, and accordingly it is preferable to make the evasion approval/disapproval notification using not only display on the display element 191 but also the audio output from the audio output device 192.

The driver who has received the evasion approval/disapproval notification inputs a response to the evasion approval/disapproval (hereinafter referred to as the approval/disapproval response) to the user input device 20. The HCU 21 outputs the approval/disapproval response received by the user input device 20 to the automatic driving ECU 10. The response acquisition unit 122 of the HCU communication unit 102 acquires the approval/disapproval response output from the HCU 21 to thereby acquire a response from the driver to the inquiry about the evasion approval/disapproval made by the confirmation instruction unit 1211.

The permission unit 134 permits, while the host vehicle is performing the automatic driving without monitoring obligation, avoidance based on an avoidance measure identified by the avoidance measure identification unit 131 on the basis of the fact that the avoidance measure is the avoidance measure outside the scope of the traffic regulations. As a result, when driving within the scope of the traffic regulations or traffic manners is not preferable during the automatic driving, driving outside the scope of the traffic regulations or traffic manners is allowed.

The permission unit 134 may appropriately permit, while the host vehicle is performing the automatic driving without monitoring obligation, the evasion to a non-legal route on the basis of the fact that the avoidance route identified by the avoidance measure identification unit 131 is the non-legal route. As a result, even when the avoidance route is the non-legal route during the automatic driving without monitoring obligation, the evasion to the non-legal route is allowed. Accordingly, even when it is necessary to avoid the obstacle during the automatic driving and when the avoidance is difficult with a behavior within the traffic regulations, it is possible to allow smooth automatic avoidance of the obstacle to be performed. The permission unit 134 corresponds to a first permission unit. In addition, processing in the permission unit 134 corresponds to a first permission step.

When the avoidance route identified by the avoidance measure identification unit 131 is the non-legal route which requires entrance into a lane opposing a lane in which the host vehicle is traveling (hereinafter referred to simply as the opposing lane) or into a road edge, the permission unit 134 preferably permits the evasion to the non-legal route on the basis of an identification of absence of another vehicle or a pedestrian where the vehicle is to enter which is made by the driving environment recognition unit 101. It is preferable to exclude a road edge of an expressway from the road edge mentioned herein. For example, the road edge mentioned herein may appropriately be the road edge demarcated by the road outer line. Consequently, even when the evasion to the non-legal route is evasion to a region where another vehicle or a pedestrian may possibly be present, it is possible to automatically avoid the vehicle and the pedestrian and perform automatic evasion.

In a case where the avoidance route identified by the avoidance measure identification unit 131 is the non-legal route and when the host vehicle can temporarily stop, the permission unit 134 preferably permits the evasion to the non-legal route when the approval/disapproval response approving the evasion to the non-legal route is acquired by the response acquisition unit 122. The permission unit 134 may appropriately identify whether or not the host vehicle can temporarily stop on the basis of a determination result from the stop determination unit 133. Consequently, when there is time to confirm the driver whether or not to approve the evasion, after confirming with the driver whether or not to approve the evasion, it is possible to automatically cause the evasion to the non-legal route. This allows the host vehicle to evade to the non-legal route approved by the driver.

Note that, when the approval/disapproval response not approving the evasion to the non-legal route is acquired by the response acquisition unit 122, it is appropriate that the permission unit 134 does not permit the evasion to the non-legal road. When the permission unit 134 does not permit the evasion to the non-legal route, the behavior determination unit 103 may appropriately generate a traveling plan to stop the host vehicle in a region where the passing of a vehicle is permitted by the traffic regulations. When the permission unit 134 does not permit the evasion to the non-legal route, the behavior determination unit 103 may also generate a traveling plan to stop the host vehicle even though, e.g., the temporary stop with a margin is not allowed. Besides, when the permission unit 134 does not permit the evasion to the non-legal route, the behavior determination unit 103 may also cause the system to issue a request for a drive change to the driver.

In a case where the avoidance route identified by the avoidance measure identification unit 131 is the non-legal route and when the host vehicle cannot temporarily stop, the permission unit 134 preferably permits the evasion to the non-legal route without causing the confirmation instruction unit 1211 to make the evasion approval/disapproval inquiry. Accordingly, when there is no time to confirm with the driver whether or not to approve the evasion, it is possible to cause automatic evasion to the non-legal road without confirming with the driver whether or not to approve the evasion.

During the sleep-permitted automatic driving, the permission unit 134 preferably permits the evasion to the non-legal road on the basis of the fact that avoidance route identified by the avoidance measure identification unit 131 is the non-legal road outside the scope of the traffic regulations according to the sleep-permitted automatic driving. Meanwhile, during the sleep-unpermitted automatic driving, the permission unit 134 permits the evasion to the non-legal road on the basis of the fact that the avoidance route identified by the avoidance measure identification unit 131 is the non-legal route outside the scope of the traffic regulations according to the sleep-unpermitted automatic driving. Accordingly, even when a region outside the scope of the traffic regulations differs due to different automation levels of the sleep-permitted automatic driving and the sleep-unpermitted automatic driving, it is possible to permit the evasion to the non-legal route depending on the difference between the automation levels.

When the permission unit 134 permits the evasion to the non-legal route, the vehicle-interior-notification instruction unit 1212 of the HCU communication unit 102 causes a notification that the evasion to the non-legal route is to be performed (hereinafter referred to as the evasion notification) to be made to the interior of the host vehicle. The vehicle-interior-notification instruction unit 1212 may appropriately cause the evasion notification to be made by outputting an instruction to cause the evasion notification to be made (hereinafter referred to as the evasion notification instruction) to the HCU 21. This allows the driver to recognize that the evasion to the non-legal route is to be automatically performed.

The HCU 21 that has received the evasion notification instruction causes the vehicle interior notification device 19 to make the evasion notification. The evasion notification may be made by the display on the display element 191 or by the audio output from the audio output device 192. For example, the evasion notification may appropriately be display of a text, display of an icon, or the audio output indicating that a route outside the scope of the traffic regulations is to be passed through for the avoidance of the obstacle.

When it is determined by the regulation determination unit 132 that the avoidance route is not the non-legal route, the behavior determination unit 103 generates the scheduled traveling path corresponding to the avoidance route as the short-term driving plan.

When the evasion approval/disapproval inquiry is not made by the confirmation instruction unit 1211, the vehicle-interior-notification instruction unit 1212 preferably causes the evasion notification to be made not only by the display on the display element 191, but also by the audio output from the audio output device 192. Meanwhile, when the evasion approval/disapproval inquiry is made by the confirmation instruction unit 1211, the vehicle-interior-notification instruction unit 1212 preferably causes the evasion notification to be made by the display on the display element 191 without causing the evasion notification to be made by the audio output from the audio output device 192. This is because, when whether or not to approve the evasion has already been confirmed with the driver, making the evasion notification even by audio may bother the driver. When the inquiry about the evasion approval/disapproval is made by the confirmation instruction unit 1211, the vehicle-interior-notification instruction unit 1212 may also simplify the display on the display element 191 compared to that in the case where the inquiry about the evasion approval/disapproval is not made. For example, the display may appropriately be simplified by causing the evasion notification to be made not by text display, but by iconic display.

When the evasion to the non-legal route is permitted by the permission unit 134, the vehicle-exterior-notification instruction unit 105 causes a notification that the evasion to the non-legal route is to be performed (i.e., evasion notification) to be made to the outside of the vehicle interior of the host vehicle. For example, the evasion notification to the outside of the vehicle may appropriately be made by lighting the hazard lamp. In this case, the vehicle-exterior-notification instruction unit 105 may appropriately give an instruction to light the hazard lamp to the body ECU 17 to light the hazard lamp. Note that, when the host vehicle has a vehicle exterior display element that performs display to the outside of the vehicle, the vehicle-exterior-notification instruction unit 105 may also behave as follows. For example, the vehicle-exterior-notification instruction unit 105 may also cause the vehicle exterior display element to perform text display or iconic display indicating passing of a route outside the scope of the traffic regulations for the avoidance of an obstacle. The foregoing configuration allows a driver of another vehicle and a pedestrian around the host vehicle to recognize that the evasion to the non-legal route is to be automatically performed.

Note that the automatic driving ECU 10 may also be configured to cause either one of the evasion notification to the vehicle interior and the evasion notification to the outside of the vehicle to be performed when the evasion to the non-legal route is permitted by the permission unit 134.

When the system side of the host vehicle has the right to control a driving operation, the control execution unit 104 performs acceleration/deceleration control, steering control, or the like for the host vehicle by cooperation with the vehicle control ECU 16 according to the traveling plan determined by the behavior determination unit 103. The control execution unit 104 executes, e.g., ACC (Adaptive Cruise Control) control, LTA (Lane Tracing Assist) control, and LCA control (Lane Change Assist).

The ACC control is control that implements constant speed traveling of the host vehicle at a set vehicle speed or following traveling after a driving-ahead vehicle. In the following traveling, the acceleration/deceleration control is performed so as to maintain the inter-vehicle distance between the host vehicle and a nearest driving-ahead vehicle at an objective inter-vehicle distance. The objective inter-vehicle distance may appropriately be set according to the speed of the host vehicle. The LTA control is control that keeps the traveling of the host vehicle within the lane. In the LTA control, the steering control is performed so as to keep the traveling of the host vehicle within the lane. The LCA control is control that causes the host vehicle to automatically change lanes from the host vehicle lane to an adjacent lane. In the LCA control, the host vehicle is caused to change lanes by causing the acceleration/deceleration control and the steering control to be executed.

The control execution unit 104 includes a stop control unit 141 as a sub-functional block. The stop control unit 141 temporarily stops the host vehicle in a case where the avoidance route identified by the avoidance measure identification unit 131 is the non-legal route and when the host vehicle can temporarily stop. The control execution unit 104 may appropriately identify whether or not the host vehicle can temporarily stop on the basis of the determination result from the stop determination unit 133.

<Obstacle-Avoidance-Related Processing in Automatic Driving ECU 10>

Using a flow chart in FIG. 3, a description will be given of an example of a flow of processing (hereinafter referred to as an obstacle-avoidance-related processing) related to the avoidance of an obstacle during the automatic driving without monitoring obligation in the automatic driving ECU 10. The flow chart in FIG. 3 may appropriately be configured to be started when, e.g., the automatic driving without peripheral monitoring obligation is started by the host vehicle.

First, in Step S1, when an obstacle is identified by the obstacle identification unit 111 (YES in S1), the flow moves to Step S2. Meanwhile, when no obstacle is identified by the obstacle identification unit 111 (NO in S1), the flow moves to Step S12. In Step S2, the avoidance measure identification unit 131 identifies the avoidance route.

In Step S3, the regulation determination unit 132 determines whether or not the avoidance route identified in S2 is the non-legal route. Then, when the avoidance route is the non-legal route (YES in S3), the flow moves to Step S5. Meanwhile, when the avoidance route is not the non-legal route (NO in S3), the flow moves to Step S4. In Step S4, the behavior determination unit 103 generates the scheduled traveling path corresponding to the avoidance route identified in S2 as the short-term traveling plan. Subsequently, the control execution unit 104 causes the host vehicle to automatically travel along the scheduled traveling path. In other words, by the driving in a region within the traffic regulations, the obstacle identified in S1 is avoided. Then, the flow moves to Step S12.

In Step S5, when the avoidance route which is the non-legal route identified in S2 is a route that requires entrance into an opposing lane or into a road edge and when another vehicle and a pedestrian are not present where the vehicle is to enter (YES in S5), the flow moves to Step S7. In other words, when it is possible to enter the non-legal route, the flow moves to Step S7. Whether or not it is possible to enter the non-legal route may appropriately be determined by the permission unit 134 on the basis of a recognition result from the driving environment recognition unit 101. Meanwhile, when it is not possible to enter the non-legal route (NO in S5), the flow moves to Step S6.

In Step S6, the control execution unit 104 stops the host vehicle in the region within the traffic regulations, and the flow moves to Step S12. In S6, it may also be possible to cause the stop control unit 141 to continue to stop the host vehicle and thereby stop the host vehicle in the region within the traffic regulations.

In Step S7, when the regulation determination unit 132 determines that the avoidance route is the non-legal route, the stop determination unit 133 determines whether or not the host vehicle can temporarily stop. Then, when it is determined that the temporary stop is possible (YES in S7), the flow moves to S8. Meanwhile, when it is determined that the temporary stop is not possible (NO in S7), the flow moves to Step S10.

In Step S8, the stop control unit 141 temporarily stops the host vehicle, while the confirmation instruction unit 1211 makes the inquiry about the evasion approval/disapproval. In Step S9, when the approval to the evasion is successfully confirmed by the permission unit 134 (YES in S9), the flow moves to step S10. Meanwhile, when the approval to the evasion is not successfully confirmed by the permission unit 134 (NO in S9), the flow moves to Step S6. By way of example, when a response that permits the evasion is acquired by the response acquisition unit 122 within a set time, the permission unit 134 may appropriately confirm the approval to the evasion. As an example in which the permission unit 134 cannot confirm the approval to the evasion, the following examples can be listed. The first example is a case where the response that permits the evasion is not successfully acquired by the response acquisition unit 122 within the set time. The second example is a case where a response that does not permit the evasion is acquired by the response acquisition unit 122 within the set time.

In Step S10, the permission unit 134 permits the evasion to the non-legal route. In Step S11, the behavior determination unit 103 generates the scheduled traveling path corresponding to the avoidance route which is the non-legal route identified in S2 as the short-term traveling plan. Subsequently, the control execution unit 104 causes the host vehicle to automatically travel along the scheduled traveling path. In other words, by the traveling in the non-legal route, the obstacle identified in S1 is avoided.

In Step S12, when it is time to end the obstacle-avoidance-related processing (YES in S12), the obstacle-avoidance-related processing is ended. Meanwhile, when it is not time to end the obstacle-avoidance-related processing (NO in S12), the flow returns to S1, and the processing is repeated. Examples of the timing of ending the obstacle-avoidance-related processing include turning OFF of a power switch of the host vehicle, a shift of the automation level of the host vehicle to LV3 or lower, and the like.

Figure 3:
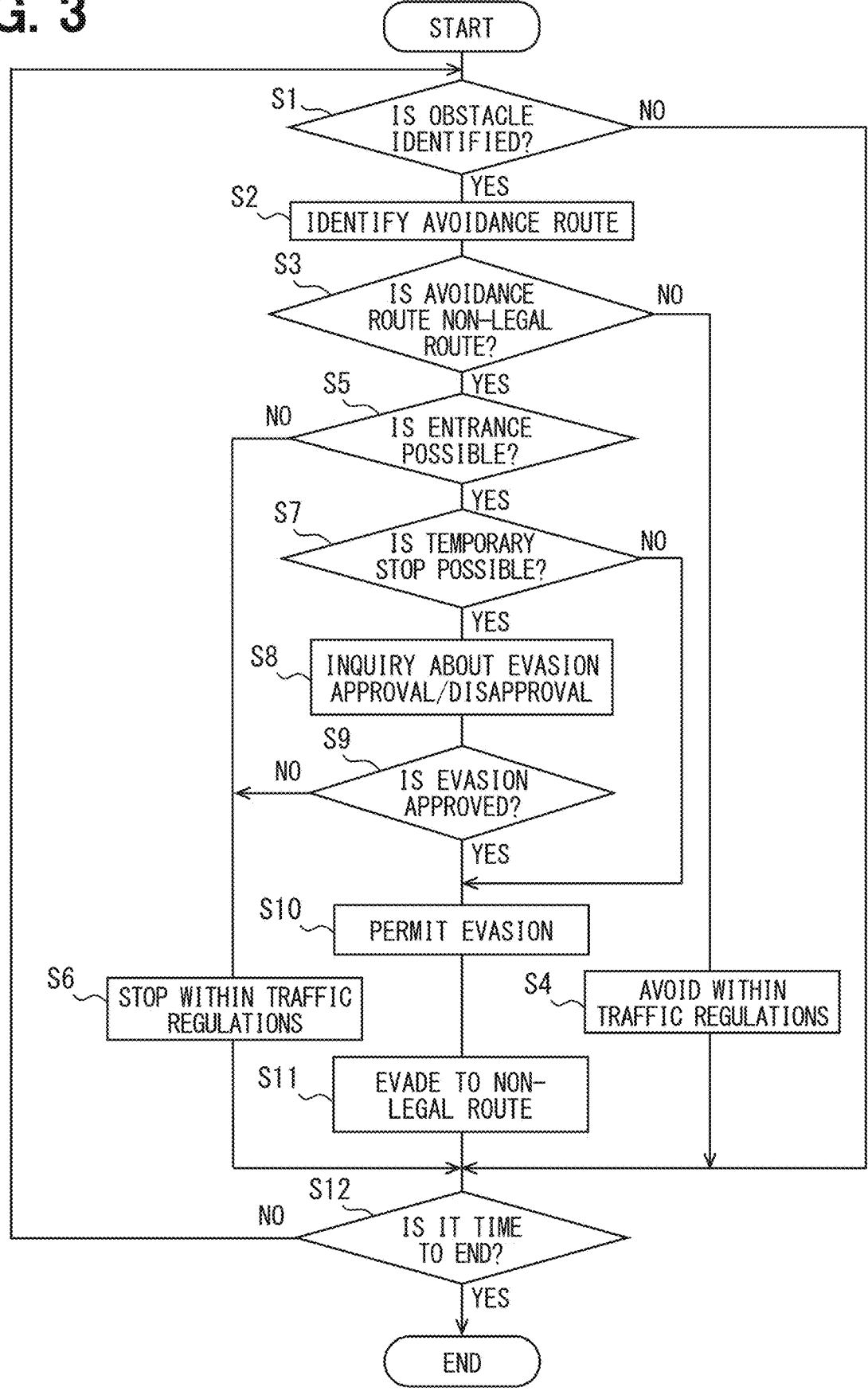
FIG. 3 is a flow chart illustrating an example of a flow of obstacle-avoidance-related processing in the automatic driving ECU.

Note that the flow chart in FIG. 3 may also be configured such that the processing in S5 to S9 is omitted. In this case, the flow chart may appropriately be configured to move to S10 when YES is given in S3. The flow chart in FIG. 3 may also be configured such that the processing in S7 to S9 is omitted. In this case, the flow chart may appropriately be configured to move to S10 when YES is given in S5. The flow chart in FIG. 3 may also be configured such that the processing in S5 is performed after the processing in S9.

The configuration in the first embodiment is intended to allow driving outside the scope of the traffic regulations when driving within the scope of the traffic regulations is not preferable during automatic driving. In particular, the configuration in the first embodiment is intended to allow, even when it is necessary to avoid an obstacle during automatic driving and when the avoidance is difficult with a behavior within the traffic regulations, automatic avoidance of the obstacle to be more smoothly performed.

Second Embodiment

The configuration is not limited to that in the embodiment described above, and the following configuration in the second embodiment may also be used. Using the drawings, a description will be given below of an example of the configuration in the second embodiment.

<Schematic Configuration of Vehicle System 1a>

Figure 4:
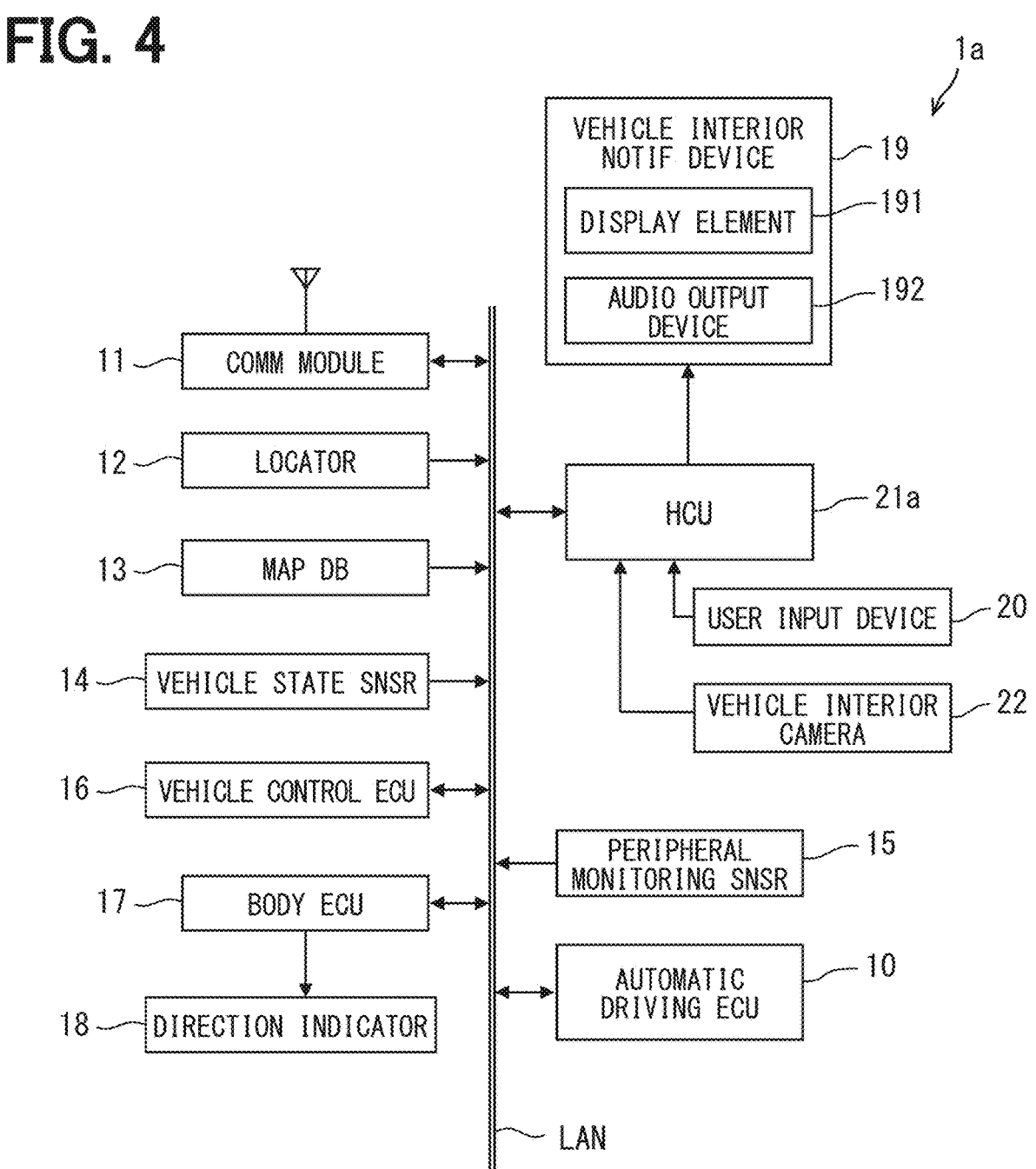
FIG. 4 is a diagram illustrating an example of a schematic configuration of the vehicle system.

Using FIG. 4, a description is given herein of a schematic configuration of a vehicle system 1a. The vehicle system 1a illustrated in FIG. 4 can be used in an automatic driving vehicle. As illustrated in FIG. 4, the vehicle system 1a includes an automatic driving ECU 10a, the communication module 11, the locator 12, the map DB 13, the vehicle state sensor 14, the peripheral monitoring sensor 15, the vehicle control ECU 16, the body ECU 17, the direction indicator 18, the vehicle interior notification device 19, the user input device 20, a HCU 21a, and an vehicle interior camera 22. The vehicle system 1a includes the automatic driving ECU 10a instead of the automatic driving ECU 10. The vehicle system 1a includes the HCU 21a instead of the HCU 21. The vehicle system 1a includes the vehicle interior camera 22. The vehicle system 1a is otherwise the same as the vehicle system 1 in the first embodiment.

The vehicle interior camera 22 captures an image of a predetermined range in the vehicle interior of the host vehicle. The vehicle interior camera 22 captures an image of a range including at least a driver seat in the host vehicle. The vehicle interior camera 22 is configured to include, e.g., an infrared light source and an infrared camera as well as a control unit that controls the infrared light source and the infrared camera or the like. The vehicle interior camera 22 photographs a passenger of the host vehicle irradiated with infrared light from the infrared light source by using the infrared camera. An image captured by the infrared camera is subjected to image analysis by the control unit. The control unit performs the image analysis of the captured image to detect feature values of a face of the driver. The control unit detects a facial orientation, a line-of-sight direction, and the like of the driver on the basis of the detected feature values of the face of the driver.

The HCU 21a is the same as the HCU 21 in the first embodiment except that processing is partly different. A description will be given below of a different part. The HCU 21*a* determines whether or not the driver is performing the peripheral monitoring on the basis of the facial orientation and the line-of-sight direction of the driver, which are sequentially detected by the vehicle interior camera 22. The HCU 21*a* preferably outputs a result of the determination of whether or not the driver is performing the peripheral monitoring to the automatic driving ECU 10*a*. The result of the determination of whether or not the driver is performing the peripheral monitoring is hereinafter referred to as the monitoring determination result.

<Schematic Configuration of Automatic Driving ECU 10*a*>

Figure 5:
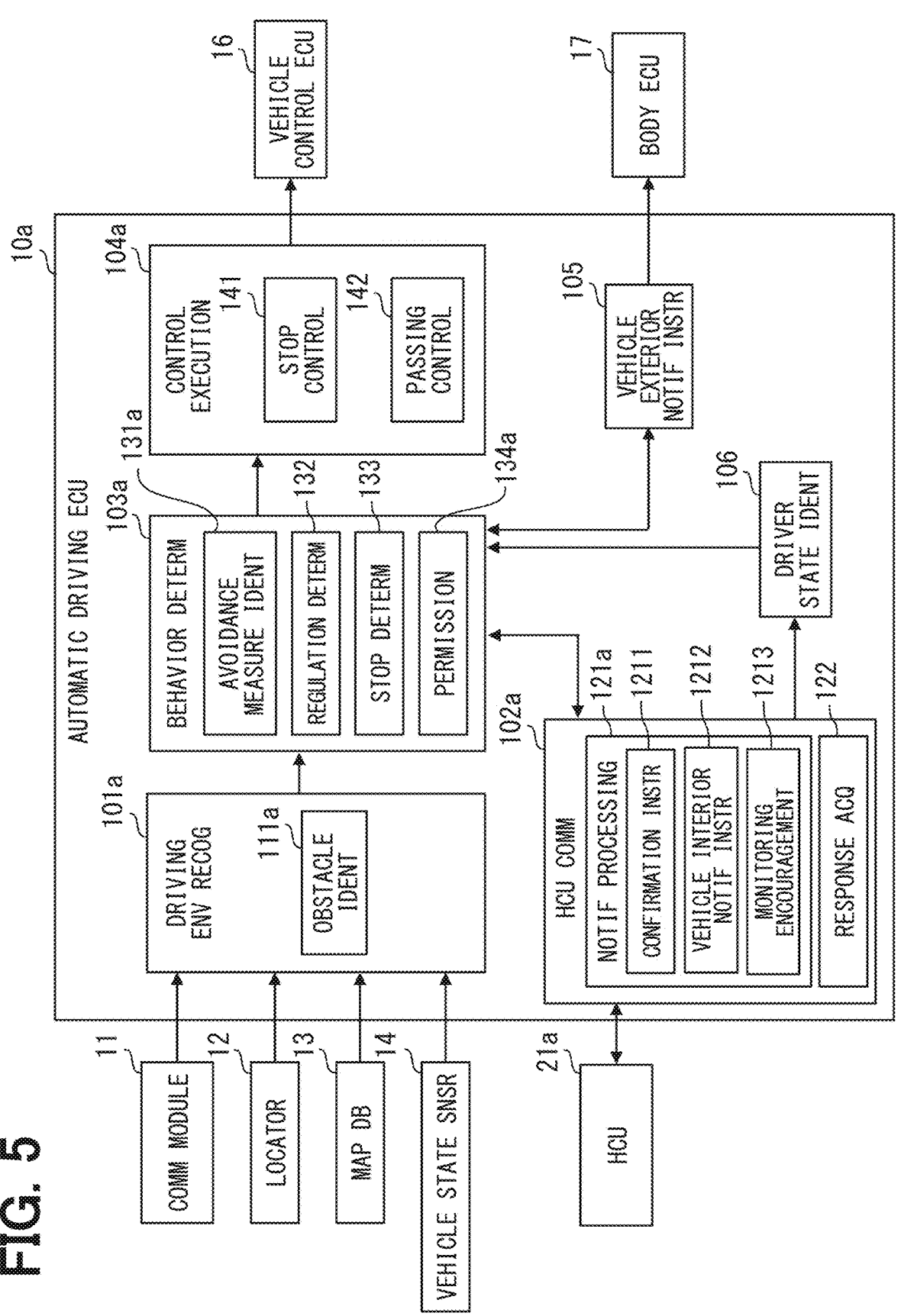
FIG. 5 is a diagram illustrating an example of a schematic configuration of the automatic driving ECU.

Subsequently, using FIG. 5, a description will be given of a schematic configuration of the automatic driving ECU 10*a*. As illustrated in FIG. 5, the automatic driving ECU 10*a* includes a driving environment recognition unit 101*a*, a HCU communication unit 102*a*, a behavior determination unit 103*a*, a control execution unit 104*a*, the vehicle-exterior-notification instruction unit 105, and a driver state identification unit 106 as functional blocks. The automatic driving ECU 10*a* includes the driving environment recognition unit 101*a* instead of the driving environment recognition unit 101. The automatic driving ECU 10*a* includes the HCU communication unit 102*a* instead of the HCU communication unit 102. The automatic driving ECU 10*a* includes the behavior determination unit 103*a* instead of the behavior determination unit 103. The automatic driving ECU 10*a* includes the control execution unit 104*a* instead of the control execution unit 104. The automatic driving ECU 10*a* includes the driver state identification unit 106. The automatic driving ECU 10*a* is otherwise the same as the automatic driving ECU 10 in the first embodiment. The automatic driving ECU 10*a* also corresponds to the vehicle control device. In addition, execution of processing in each of the functional blocks of the automatic driving ECU 10*a* by a computer corresponds to implementation of the vehicle control method.

The driving environment recognition unit 101*a* is the same as the driving environment recognition unit 101 in the first embodiment except that processing is partly different. A description will be given below of a different part. The driving environment recognition unit 101*a* identifies whether or not an obstacle is present within a predetermined range from a stop line. The stop line mentioned herein is a stop line where a temporary stop is mandatory under the traffic regulations. Examples of such a stop line include a stop line at an intersection with a temporary stop sign and the like. The obstacle may appropriately be an obstacle that is presumed to prevent the host vehicle from passing. The obstacle may also be limited to a moving body. The predetermined range may optionally be settable. The predetermined range may appropriately be a range in which the obstacle described above presumably has a low possibility of preventing the host vehicle from passing. The driving environment recognition unit 101*a* also corresponds to the driving environment identification unit.

The driving environment recognition unit 101*a* has an obstacle identification unit 111*a* as a sub-functional block. The obstacle identification unit 111*a* identifies approach of an emergency vehicle to the host vehicle as an obstacle that prevents the host vehicle from traveling. The obstacle identification unit 111*a* is otherwise the same as the obstacle identification unit 111 in the first embodiment. Processing in the obstacle identification unit 111*a* also corresponds to the obstacle identification step. The emergency vehicle is a vehicle to which the host vehicle is required to yield a right-of-way under the traffic regulations when the emergency vehicle is approaching the host vehicle. As the emergency vehicle, an ambulance vehicle, a fire vehicle, a patrol car, or the like can be listed. The approach of the emergency vehicle to the host vehicle may appropriately be approach in which a distance between the emergency vehicle and the host vehicle is less than a prescribed distance. The prescribed distance may appropriately be optionally settable. The obstacle identification unit 111*a* may also identify the approach of the emergency vehicle to the host vehicle on the basis of position information, speed information, or the like of the emergency vehicle, which is acquired via the communication module 11.

The HCU communication unit 102*a* includes a notification processing unit 121*a* and the response acquisition unit 122 as sub-functional blocks. The HCU communication unit 102*a* is the same as the HCU communication unit 102 in the first embodiment except that the notification processing unit 121*a* is included therein instead of the notification processing unit 121. The notification processing unit 121*a* includes the confirmation instruction unit 1211, the vehicle-interior-notification instruction unit 1212, and a monitoring encouragement unit 1213 as sub-functional blocks. The notification processing unit 121*a* is the same as the notification processing unit 121 in the first embodiment except that the monitoring encouragement unit 1213 is included therein. A description will be given later of processing in the monitoring encouragement unit 1213.

The behavior determination unit 103 includes an avoidance measure identification unit 131*a*, the regulation determination unit 132, the stop determination unit 133, and a permission unit 134*a* as sub-functional blocks. The behavior determination unit 103*a* includes the avoidance measure identification unit 131*a* instead of the avoidance measure identification unit 131. The behavior determination unit 103*a* includes the permission unit 134*a* instead of the permission unit 134. The behavior determination unit 103*a* is otherwise the same as the behavior determination unit 103 in the first embodiment.

The avoidance measure identification unit 131*a* is the same as the avoidance measure identification unit 131 in the first embodiment except that processing is partly different. A description will be given below of a different part. When the approach of the emergency vehicle to the host vehicle is identified by the obstacle identification unit 111*a*, the avoidance measure identification unit 131*a* identifies, as an avoidance measure, passing without stopping at a stop line. Processing in the avoidance measure identification unit 131*a* also corresponds to the avoidance measure identification step.

The permission unit 134*a* is the same as the permission unit 134 in the first embodiment except that processing is partly different. A description will be given below of a different part. When the avoidance measure identified by the avoidance measure identification unit 131*a* is the passing without stopping at a stop line, the permission unit 134*a* permits the passing without stopping at a stop line on the basis of an identification of an obstacle within a predetermined range from the stop line which is made by the driving environment recognition unit 101*a*. This allows the passing without a stop at the stop line even during the automatic driving without monitoring obligation when the passing without a stop at the stop line is required to avoid the obstacle and it is possible to reduce a possibility of contact with another obstacle other than the obstacle. Processing in the permission unit 134*a* also corresponds to a first permission step.

When the permission unit 134*a* permits the passing without a stop at the stop line, the monitoring encouragement unit 1213 of the HCU communication unit 102*a* preferably causes a notification to be made to the driver of the host vehicle to encourage the peripheral monitoring. The notification to encourage the peripheral monitoring (hereinafter referred to as the monitoring encouragement notification) is display, an audio output, or the like which encourages the driver to perform the peripheral monitoring. Examples of the monitoring encouragement notification include display of a text and an audio output such as "Please check the area around your vehicle". According to this, even during the automatic driving without monitoring obligation, it is possible to encourage the driver to perform the peripheral monitoring and even avoid the obstacle through the intervention of the driver. Consequently, even in a case of passing without stopping at a stop line to avoid an obstacle, it is possible to further reduce the possibility of the contact with another obstacle other than the obstacle.

When the permission unit 134*a* permits the passing without stopping at a stop line, the vehicle-interior-notification instruction unit 1212 of the HCU communication unit 102*a* preferably causes a notification related to the passing without stopping at a stop line (hereinafter referred to as the stop-relaxation-related notification) to be made to the driver of the host vehicle. This allows the driver to recognize information related to the passing without stopping at a stop line. The stop-relaxation-related notification preferably includes a reason for permitting the passing without stopping at a stop line. For example, when an approaching emergency vehicle is the reason, as the stop-relaxation-related notification, an icon of the emergency vehicle may appropriately be displayed. This can allow the driver to recognize the reason for the passing without stopping at a stop line and increase a sense of security of the driver about the system of the host vehicle.

The control execution unit 104*a* includes the stop control unit 141 and a passing control unit 142 as sub-functional blocks. The control execution unit 104*a* is the same as the control execution unit 104 in the first embodiment except that the passage control unit 142 is included therein. When the permission unit 134*a* permits the passing without stopping at a stop line, the passing control unit 142 preferably controls the speed of the host vehicle to a prescribed value or less before the host vehicle reaches the stop line. The prescribed value mentioned herein may appropriately be a speed corresponding to a so-called lowest speed. In other words, a speed which allows the host vehicle to immediately stop may appropriately be achieved. By way of example, a speed at 5 km/h or less may appropriately be achieved. When the host vehicle is an automatic transmission vehicle using a torque converter, a travel speed in a creep phenomenon may appropriately be achieved. In addition, while the host vehicle is crossing the stop line, the passage control unit 142 preferably causes the host vehicle to travel at a speed of the prescribed value or less. A period during which the host vehicle is crossing the stop line may appropriately be a period until a vehicle body of the host vehicle has completely passed over the stop line. Whether or not the host vehicle is crossing the stop line may appropriately be determined by, e.g., the control execution unit 104*a* by making a prediction on the basis of a position of the stop line with respect to the host vehicle, which is recognized by the driving environment recognition unit 101*a*, and a behavior of the host vehicle. According to this, even in the case of passing without stopping at a stop line to avoid an obstacle, it is possible to further reduce the possibility of contact with another obstacle other than the obstacle.

The driver state identification unit 106 identifies a state of the driver of the host vehicle. The driver state identification unit 106 identifies whether or not the driver of the host vehicle is performing the peripheral monitoring on the basis of a monitoring determination result acquired from the HCU 21*a* via the HCU communication unit 102*a*.

When the avoidance measure identified by the avoidance measure identification unit 131*a* is the passing without stopping at a stop line, the permission unit 134*a* preferably permits the passing without stopping at a stop line under the condition that the driving environment identification unit 101*a* has identified no obstacle present within a predetermined range from the stop line and that the driver state identification unit 106 is performing the peripheral monitoring. According to this, even in the case of passing without stopping at a stop line to avoid an obstacle, it is possible to especially reduce the possibility of contact with another obstacle other than the obstacle.

Third Embodiment

The configuration is not limited to those in the embodiments described above, and the following configuration in the third embodiment may also be used.

Using the drawings, a description will be given below of an example of the configuration in the third embodiment. The vehicle system 1 in the third embodiment is the same as the vehicle system 1 in the first embodiment except that an automatic driving ECU 10*b* is included therein instead of the automatic driving ECU 10.

<Schematic Configuration of Automatic Driving ECU 10*b*>

Figure 6:
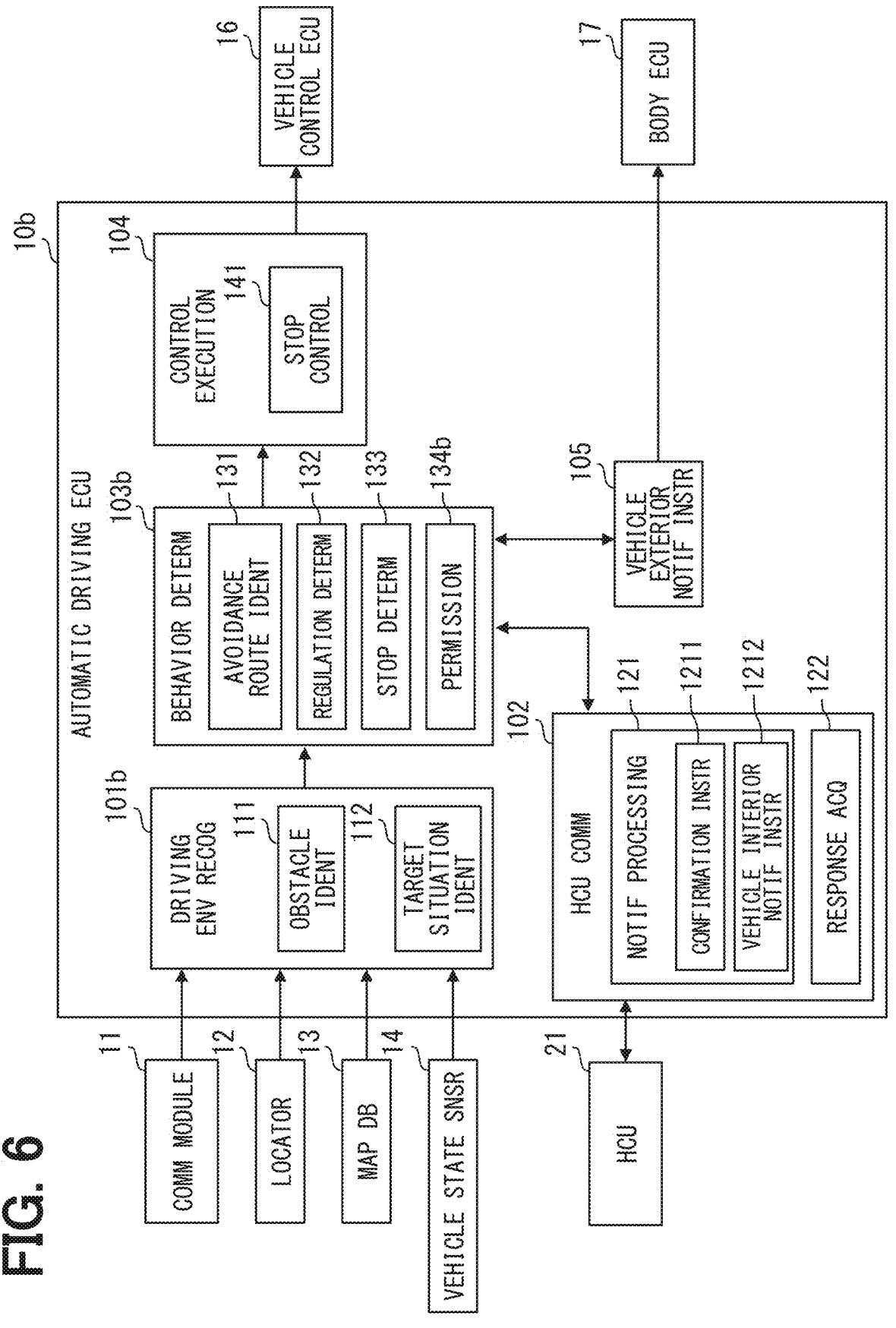
FIG. 6 is a diagram illustrating an example of a schematic configuration of the automatic driving ECU.

Subsequently, using FIG. 6, a description will be given of a schematic configuration of the automatic driving ECU 10*b*. As illustrated in FIG. 6, the automatic driving ECU 10*b* includes a driving environment recognition unit 101*b*, the HCU communication unit 102, a behavior determination unit 103*b*, the control execution unit 104, and the vehicle-exterior-notification instruction unit 105 as functional blocks. The automatic driving ECU 10*b* includes the driving environment recognition unit 101*b* instead of the driving environment recognition unit 101. The automatic driving ECU 10*b* includes the behavior determination unit 103*b* instead of the behavior determination unit 103. The automatic driving ECU 10*b* is otherwise the same as the automatic driving ECU 10 in the first embodiment. The automatic driving ECU 10*b* also corresponds to the vehicle control device. In addition, execution of processing in each of the functional blocks of the automatic driving ECU 10*b* by a computer corresponds to the implementation of the vehicle control method.

The driving environment recognition unit 101*b* includes the obstacle identification unit 111 and a target situation identification unit 112 as sub-functional blocks. The driving environment recognition unit 101*b* is the same as the driving environment recognition unit 101 in the first embodiment except that the target situation identification unit 112 is included therein. The target situation identification unit 112 identifies a target situation in which it is set in advance that the host vehicle preferably performs deviant driving which is driving outside the scope of the traffic regulations or traffic manners during the automatic driving without monitoring obligation. Processing in the target situation identification unit 112 corresponds to a target situation identification step. The target situation identification unit 112 identifies that a vehicle driving ahead of the host vehicle is performing automatic driving as the target situation. The target situation identification unit 112 may appropriately identify that the driving-ahead vehicle is performing automatic driving as follows. When the driving-ahead vehicle is a vehicle which performs vehicle exterior display indicating that the driving-ahead vehicle is performing automatic driving, the driving-ahead vehicle performing the automatic driving may appropriately be identified by performing image recognition of the vehicle exterior display. When the driving-ahead vehicle is a vehicle which transmits information indicating that the driving-ahead vehicle is performing automatic driving by inter-vehicle communication, the driving-ahead vehicle performing the automatic driving may appropriately be identified by acquiring the information via the communication module 11. Note that the automatic driving of the driving-ahead vehicle may appropriately be configured to be limited to the automatic driving without monitoring obligation.

The behavior determination unit 103b includes the avoidance measure identification unit 131, the regulation determination unit 132, the stop determination unit 133, and a permission unit 134b as sub-functional blocks. The behavior determination unit 103b is the same as the behavior determination unit 103 in the first embodiment except that the permission unit 134b is included therein instead of the permission unit 134.

The permission unit 134b is the same as the permission unit 134 in the first embodiment except that processing is partly different. A description will be given below of a different part. When the target situation is identified by the target situation identification unit 112 during the automatic driving without monitoring obligation, the permission unit 134b permits the deviant driving according to the target situation. According to this, when driving within the scope of the traffic regulations or traffic manners is not preferable during automatic driving, driving outside the scope of the traffic regulations or traffic manners is allowed even during the automatic driving without monitoring obligation. The permission unit 134b corresponds to a second permission unit. In addition, processing in the permission unit 134b corresponds to a second permission step.

When it is identified by the target situation identification unit 112 that a vehicle driving ahead of the host vehicle is performing automatic driving during the automatic driving without monitoring obligation, the permission unit 134b permits an inter-vehicle distance between the host vehicle and the driving-ahead vehicle to be set less than a threshold set in advance as the scope of the traffic manners. The inter-vehicle distance between the host vehicle and the driving-ahead vehicle is hereinafter referred to as the to-driving-ahead-vehicle distance. The threshold mentioned herein may appropriately be a distance estimated to be unlikely to give a feeling of pressure to the driving-ahead vehicle, which is freely settable. The threshold may appropriately be varied according to the vehicle speed of the host vehicle. It is considered that, when the vehicle driving ahead of the host vehicle is performing automatic driving, there are a small number of behavior changes hard to predict. Accordingly, even when the to-driving-ahead-vehicle distance is set less than the threshold mentioned above, it is conceivably easy to avoid close proximity to the driving-ahead vehicle. The configuration described above allows the to-driving-ahead-vehicle distance to be reduced to a distance outside the scope of the traffic manners for the avoidance of an obstacle or the like even during the automatic driving without monitoring obligation in a situation in which it is conceivably easy to avoid close proximity to the driving-ahead vehicle.

The permission unit 134b may also be configured to permit the to-driving-ahead-vehicle distance to be set less than the threshold mentioned above when it is identified by the target situation identification unit 112 that the vehicle driving ahead of the host vehicle is performing the automatic driving during the automatic driving without monitoring obligation and when the to-driving-ahead-vehicle distance is preferably set less than the threshold mentioned above for the avoidance of the obstacle identified by the obstacle identification unit 111. According to this, only in situations where it is conceivably easy to avoid close proximity to the driving-ahead vehicle and where the avoidance of the obstacle is necessary, it is possible to reduce the to-driving-ahead-vehicle distance to the distance outside the scope of the traffic manners.

Fourth Embodiment

The configuration is not limited to those in the embodiments described above, and the following configuration in the fourth embodiment may also be used. Using the drawings, a description will be given below of an example of the configuration in the fourth embodiment. The vehicle system 1 in the fourth embodiment is the same as the vehicle system 1 in the first embodiment except that an automatic driving ECU 10c is included therein instead of the automatic driving ECU 10.

<Schematic Configuration of Automatic Driving ECU 10c>

Figure 7:
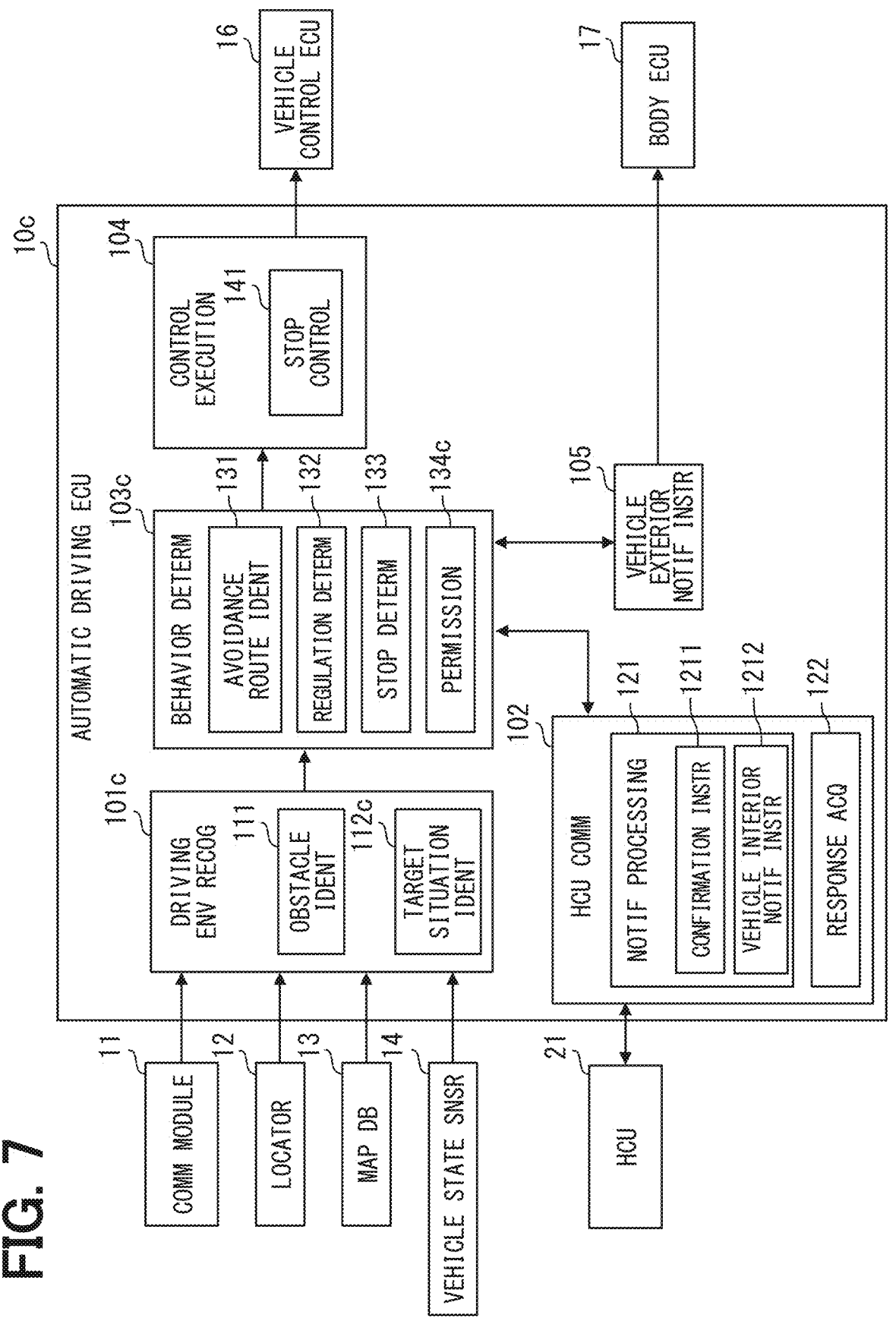
FIG. 7 is a diagram illustrating an example of a schematic configuration of the automatic driving ECU.

Subsequently, using FIG. 7, a description will be given of a schematic configuration of the automatic driving ECU 10c. As illustrated in FIG. 7, the automatic driving ECU 10c includes a driving environment recognition unit 101c, the HCU communication unit 102, a behavior determination unit 103c, the control execution unit 104, and the vehicle-exterior-notification instruction unit 105 as functional blocks. The automatic driving ECU 10c includes the driving environment recognition unit 101c instead of the driving environment recognition unit 101b. The automatic driving ECU 10c includes the behavior determination unit 103c instead of the behavior determination unit 103b. The automatic driving ECU 10c is otherwise the same as the automatic driving ECU 10b in the third embodiment. The automatic driving ECU 10c also corresponds to the vehicle control device. In addition, execution of processing in each of the functional blocks of the automatic driving ECU 10b by a computer corresponds to the implementation of the vehicle control method.

The driving environment recognition unit 101c includes the obstacle identification unit 111 and a target situation identification unit 112c as sub-functional blocks. The driving environment recognition unit 101c is the same as the driving environment recognition unit 101b in the third embodiment except that the target situation identification unit 112c is included therein instead of the target situation identification unit 112. The target situation identification unit 112c is the same as the target situation identification unit 112 in the third embodiment except that processing is partly different. A description will be given below of a different part.

The target situation identification unit 112c identifies that a speed of a peripheral vehicle around the host vehicle is in excess of a speed limit determined by the traffic regulations as the target situation. Processing in the target situation identification unit 112c corresponds to the target situation identification step. The speed limit determined by the traffic regulations is hereinafter referred to simply as the speed limit. The peripheral vehicle in this case may appropriately be a vehicle located within a predetermined range from the host vehicle. The predetermined range may appropriately be a range of, e.g., several tens of meters from the host vehicle and freely settable. The peripheral vehicle may also be limited to a vehicle located in the lane in which the host vehicle is traveling and in a lane which is adjacent to the host vehicle lane and in the same direction of travel as that in the host vehicle lane. The target situation identification unit 112c may appropriately identify the speed limit determined by the traffic regulations in the map data. In this case, the map data may appropriately include speed limits for individual links. The target situation identification unit 112c may also be configured to identify that speeds of some of a plurality of the peripheral vehicles around the host vehicle are in excess of the speed limit determined by the traffic regulations as the target situation.

The behavior determination unit 103c includes the avoidance measure identification unit 131, the regulation determination unit 132, the stop determination unit 133, and a permission unit 134c as sub-functional blocks. The behavior determination unit 103c is the same as the behavior determination unit 103b in the third embodiment except that the permission unit 134c is included therein instead of the permission unit 134b.

The permission unit 134c is the same as the permission unit 134b in the third embodiment except that processing is partly different. A description will be given below of a different part. When it is identified by the target situation identification unit 112c that the speed of the peripheral vehicle around the host vehicle is in excess of the speed limit during the automatic driving without the monitoring obligation, the permission unit 134c permits the speed of the host vehicle to match the speed of the peripheral vehicle even though the speed limit is exceeded. "Matching the speed of the peripheral vehicle" mentioned herein refers to setting the speed of the host vehicle substantially equal to the speed of the peripheral vehicle. "Being substantially equal to" includes an error-level difference. When the speed of the host vehicle becomes significantly lower than that of the peripheral vehicle as a result of keeping the speed limit, the traffic may be rather disturbed thereby or a risk of contact with the peripheral vehicle may be increased. By contrast, according to the foregoing configuration, even during the automatic driving without the monitoring obligation, it is possible to reduce the possibility of such trouble. The permission unit 134c also corresponds to the second permission unit. In addition, processing in the permission unit 134c also corresponds to the second permission step.

The permission unit 134c may also be configured to permit, when it is identified by the target situation identification unit 112c that the speeds of some of the plurality of peripheral vehicles around the host vehicle are in excess of the speed limit during the automatic driving without monitoring obligation, the speed of the host vehicle to match the speeds of the peripheral vehicles even though the speed limit is exceeded. According to this, when only one of the peripheral vehicles is traveling in a manner that does not match the surroundings, it is possible to inhibit the speed of the host vehicle from exceeding the speed limit according to the speed of the peripheral vehicle.

Fifth Embodiment

The configuration is not limited to those in the embodiments described above, and the following configuration in the fifth embodiment may also be used. Using the drawings, a description will be given below of an example of the configuration in the fifth embodiment. The vehicle system 1 in the fifth embodiment is the same as the vehicle system 1 in the first embodiment except that an automatic driving ECU 10d is included therein instead of the automatic driving ECU 10.

<Schematic Configuration of Automatic Driving ECU 10d>

Figure 8:
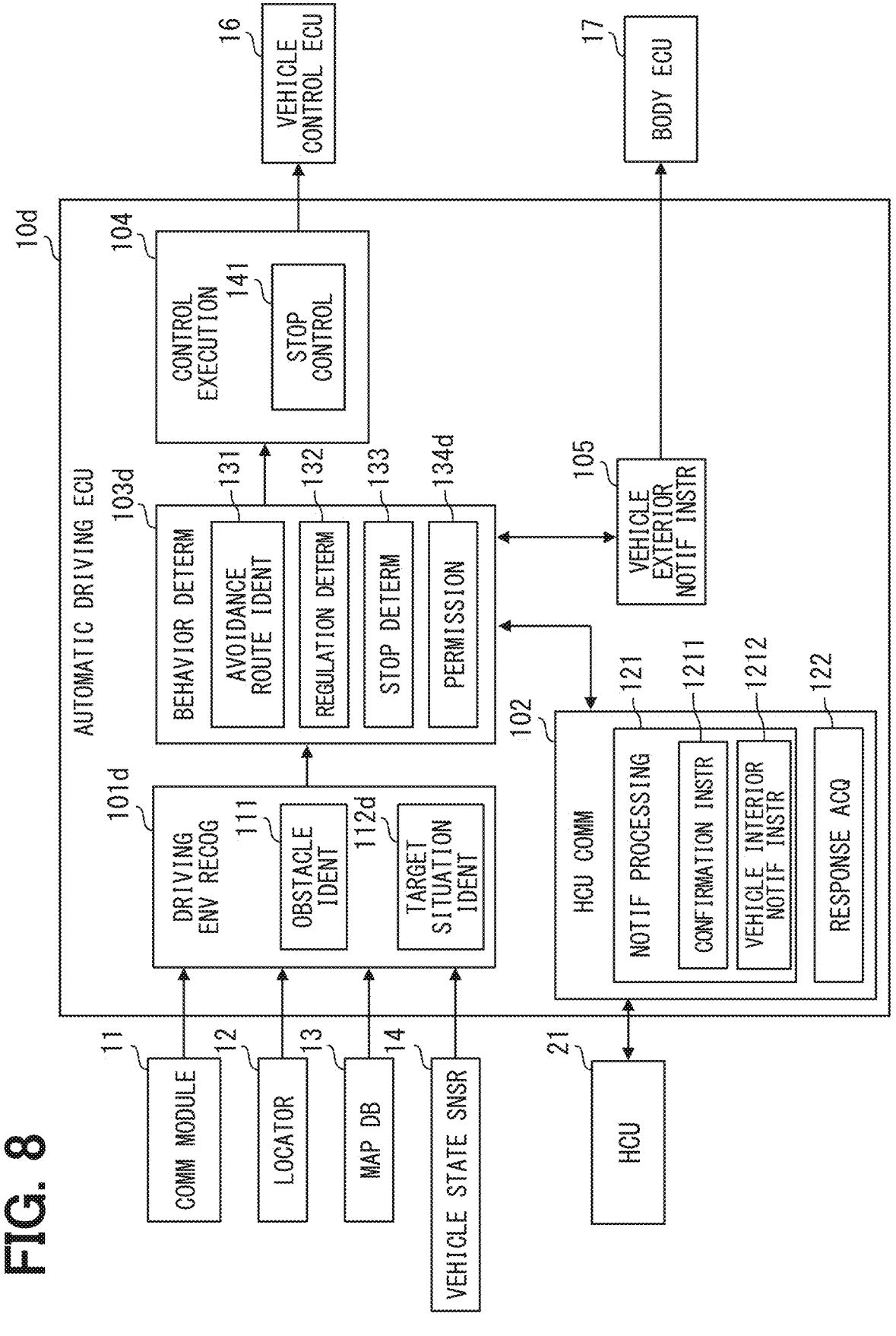
FIG. 8 is a diagram illustrating an example of a schematic configuration of the automatic driving ECU.

Subsequently, using FIG. 8, a description will be given of a schematic configuration of the automatic driving ECU 10d. As illustrated in FIG. 8, the automatic driving ECU 10d includes a driving environment recognition unit 101d, the HCU communication unit 102, a behavior determination unit 103d, the control execution unit 104, and the vehicle-exterior-notification instruction unit 105 as functional blocks. The automatic driving ECU 10d includes the driving environment recognition unit 101d instead of the driving environment recognition unit 101b. The automatic driving ECU 10d includes the behavior determination unit 103d instead of the behavior determination unit 103b. The automatic driving ECU 10d is otherwise the same as the automatic driving ECU 10b in the third embodiment. The automatic driving ECU 10d also corresponds to the vehicle control device. In addition, execution of processing in each of the functional blocks of the automatic driving ECU 10d by a computer corresponds to the implementation of the vehicle control method.

The driving environment recognition unit 101d includes the obstacle identification unit 111 and a target situation identification unit 112d as sub-functional blocks. The driving environment recognition unit 101d is the same as the driving environment recognition unit 101b in the third embodiment except that the target situation identification unit 112d is included therein instead of the target situation identification unit 112. The target situation identification unit 112d is the same as the target situation identification unit 112 in the third embodiment except that processing is partly different. A description will be given below of a different part.

The target situation identification unit 112d identifies a target situation in which it is set in advance that traveling the wrong way on a section determined to have one-way traffic by the traffic regulations is preferable. Processing in the target situation identification unit 112d corresponds to the target situation identification step. The section determined to have one-way traffic by the traffic regulations is hereinafter referred to as a one-way traffic section. Examples of such a target situation include a situation in which it is necessary to enter the one-way traffic section to avoid the obstacle identified by the obstacle identification unit 111. Another example is a situation in which absence of an oncoming vehicle on the one-way traffic section is successfully confirmed, and it is possible to reach a destination faster by traveling the wrong way on the one-way traffic section. Absence of an oncoming vehicle on the one-way traffic section may appropriately be confirmed by the target situation identification unit 112d by acquiring position information of another vehicle by, e.g., vehicle-to-vehicle communication or road-to-vehicle communication. Whether or not it is possible to reach the destination faster by traveling the wrong way on the one-way traffic section may appropriately be determined by the target situation identification unit 112d on the basis of a route search by the behavior determination unit 103.

The behavior determination unit 103d includes the avoidance measure identification unit 131, the regulation determination unit 132, the stop determination unit 133, and a permission unit 134d as sub-functional blocks. The behavior determination unit 103d is the same as the behavior determination unit 103*b* in the third embodiment except that the permission unit 134*d* is included therein instead of the permission unit 134*b*.

The permission unit 134*d* is the same as the permission unit 134*b* in the third embodiment except that processing is partly different. A description will be given below of a different part. When the target situation identification unit 112*d* has identified a target situation in which it is set in advance that traveling the wrong way on the one-way traffic section is preferable during the automatic driving without monitoring obligation, the permission unit 134*d* permits the host vehicle to travel the wrong way on the one-way traffic section. According to this, even during the automatic driving without monitoring obligation when it is preferable to travel the wrong way on the one-way traffic section, driving on the one-way traffic section is allowed. The permission unit 134*d* also corresponds to the second permission unit. In addition, processing in the permission unit 134*d* also corresponds to the second permission step.

Sixth Embodiment

In the configuration shown in the first embodiment described above, during the automatic driving during which the automation level of the host vehicle is LV3 or higher, the avoidance based on the deviant measure is permitted, but the present disclosure is not necessarily limited thereto. For example, it may also be possible to use a configuration (hereinafter referred to as the sixth embodiment) in which the avoidance based on the deviant measure is not permitted during automatic driving during which the automation level of the host vehicle is less than LV3, but the avoidance based on the deviant measure is permitted when the automation level of the host vehicle is LV4 or higher.

The sixth embodiment may appropriately be the same as the first and second embodiments except that, on the basis of the fact that the avoidance measure identified by the avoidance measure identification unit 131 or 131*a* during automatic driving during which the automatic level of the host vehicle is LV4 or higher is the deviant measure, the permission unit 134 or 134*a* permits the avoidance based on the deviant measure.

Automatic driving at Level 4 or higher is the automatic driving during which the driver is permitted to sleep. Accordingly, during the automatic driving at Level 4 or higher, even during an emergency, the system side is required to perform avoidance control. By contrast, with the configuration in the sixth embodiment, even when the avoidance measure is the deviant measure, it is possible to cause automatic avoidance based on the deviant measure. Therefore, it is possible to allow only the system side to cause smooth automatic avoidance of the obstacle without a drive change to the driver.

Seventh Embodiment

In each of the configurations shown in the embodiments described above, the automatic driving ECU 10, 10*a*, 10*b*, 10*c*, or 10*d* includes the notification processing unit 121 or 121*a*, but the present disclosure is not necessarily limited thereto. For example, it may also be possible to use a configuration in which a unit other than the automatic driving ECUs 10, 10*a*, 10*b*, 10*c*, and 10*d* has the function of the notification processing unit 121 or 121*a*. By way of example, the HCU 21 or 21*a* may also have the function of the notification processing unit 121 or 121*a*. In this case, a configuration including the automatic driving ECU 10, 10*a*, 10*b*, 10*c*, or 10*d* and the HCU 21 or 21*a* corresponds to the vehicle control device.

Eighth Embodiment

In each of the configurations shown in the embodiments described above, the automatic driving ECU 10, 10*a*, 10*b*, 10*c*, or 10*d* includes the vehicle-exterior-notification instruction unit 105, but the present disclosure is not necessarily limited thereto. For example, it may also be possible to use a configuration in which a unit other than the automatic driving ECUs 10, 10*a*, 10*b*, 10*c*, and 10*d* has the function of the vehicle-exterior-notification instruction unit 105. By way of example, the body ECU 17 may also have the function of the vehicle-exterior-notification instruction unit 105. In this case, a configuration including the automatic driving ECU 10, 10*a*, 10*b*, 10*c*, or 10*d* and the body ECU 17 corresponds to the vehicle control device.

Ninth Embodiment

In each of the configurations shown in the embodiments described above, the automatic driving ECU 10, 10*a*, 10*b*, 10*c*, or 10*d* includes the driving environment recognition unit 101, 101*a*, 101*b*, 101*c*, or 101*d*, but the present disclosure is not necessarily limited thereto. For example, it may also be possible to use a configuration in which an ECU other than the automatic driving ECUs 10, 10*a*, 10*b*, 10*c*, and 10*d* has the function of the driving environment recognition unit 101, 101*a*, 101*b*, 101*c*, or 101*d*. In this case, the automatic driving ECU 10, 10*a*, 10*b*, 10*c*, or 10*d* may appropriately acquire information on the driving environment recognized by the ECU having the function of the driving environment recognition unit 101, 101*a*, 101*b*, 101*c*, or 101*d* and identify the driving environment and the obstacle that prevents the host vehicle from driving. In this case, a functional block that identifies the driving environment in the automatic driving ECU 10, 10*a*, 10*b*, 10*c*, or 10*d* corresponds to the driving environment identification unit and the obstacle identification unit.

Note that the present disclosure is not limited to the embodiments described above, and can variously be modified within the scope of claims. Embodiments obtained by appropriately combining the technical means disclosed in the different embodiments are also included within the technical scope of the present disclosure. In addition, the control unit described in the present disclosure and a method therefor may also be implemented by a special purpose computer including a processor programmed to execute one or a plurality of functions embodied by a computer program. Alternatively, the device described in the present disclosure and the method therefor may also be implemented by a special purpose hardware logic circuit. Still alternatively, the device described in the present disclosure and the method therefor may also be implemented by one or more special purpose computers each including a combination of a processor that executes a computer program and one or more hardware logic circuits. The computer program may also be stored as an instruction to be executed by a computer on a computer readable non-transitory tangible recording medium.

What is claimed is:

1. A vehicle control device used in a vehicle that performs automatic driving without monitoring obligation, which is automatic driving without peripheral monitoring obligation, the vehicle control device comprising:

at least one of (i) a circuit and (ii) a processor with a memory storing computer program code executable by the processor, the at least one of the circuit and the processor configured to cause the vehicle control device to:

identity an obstacle which prevents the vehicle from traveling;

to identify, when the obstacle is identified, an avoidance measure that allows the vehicle to avoid the obstacle;

permit, during the automatic driving without monitoring obligation, an avoidance based on a deviant measure on a basis of a fact that the identified avoidance measure is a deviant measure outside a scope of traffic regulations; and perform acceleration/deceleration control and steering control for the vehicle and to cause the vehicle control device to control at least one of a speed, a steering angle, or a braking force of the vehicle so as to execute the avoidance based on the deviant measure when the avoidance based on the deviant measure is permitted;

wherein:

when the obstacle is identified, the identified avoidance measure is an avoidance route which is a route that allows the vehicle to avoid the obstacle;

the at least one of the circuit and the processor are further configured to cause the vehicle control device to permit evasion to the non-legal route during the automatic driving without the monitoring obligation on a basis of the identified avoidance route being a non-legal route outside the traffic regulations which is included in the deviant measure.

2. The vehicle control device according to claim 1, wherein the at least one of the circuit and the processor is further configured to cause the vehicle control device to:

identify an environment in which the vehicle is traveling, wherein:

when the identified avoidance route is the non-legal route and is also a route which requires entrance into a lane opposing a lane in which the vehicle is traveling or into a road edge, the evasion to the non-legal route is permitted on a basis of an identification of absence of another vehicle or a pedestrian where the vehicle is to enter.

3. The vehicle control device according to claim 1, wherein the at least one of the circuit and the processor is further configured to cause the vehicle control device to:

temporarily stop the vehicle when the identified avoidance route is the non-legal route and the vehicle can temporarily stop;

cause an inquiry to be made to a driver of the vehicle about whether or not the driver approves the evasion to the non-legal route when the identified avoidance route is the non-legal route and when the vehicle can temporarily stop; and acquire, from the driver, a response to the inquiry about an approval or disapproval, wherein:

the evasion to the non-legal route is permitted when the identified avoidance route is the non-legal route, and the vehicle can temporarily stop, and also when the response approving the evasion to the non-legal route is acquired.

4. The vehicle control device according to claim 3, wherein:

the evasion to the non-legal route is permitted without the inquiry about the approval or disapproval when the identified avoidance route is the non-legal route outside the scope of the traffic regulations and also when the vehicle cannot temporarily stop.

5. The vehicle control device according to claim 1, wherein:

the vehicle control device can be used in a vehicle that performs sleep-permitted automatic driving which is included in the automatic driving without monitoring obligation and in which a driver of the vehicle is permitted to sleep; and during the sleep-permitted automatic driving, the evasion to the non-legal route is permitted on the basis of the fact that the identified avoidance route is the non-legal route.

6. The vehicle control device according to claim 1, wherein:

the vehicle control device can be used in a vehicle that performs at least sleep-permitted automatic driving which is included in the automatic driving without monitoring obligation and in which a driver of the vehicle is permitted to sleep and sleep-unpermitted automatic driving which is included in the automatic driving without monitoring obligation and in which the driver of the vehicle is not permitted to sleep;

due to different automation levels of the sleep-permitted automatic driving and the sleep-unpermitted automatic driving, regions falling outside a scope of the traffic regulations are different;

during the sleep-permitted automatic driving, when the identified avoidance route is a non-legal route outside a scope of traffic regulations according to the sleep-permitted automatic driving, evasion to the non-legal route is permitted; and during the sleep-unpermitted automatic driving, when the identified avoidance route is a non-legal route outside a scope of traffic regulations according to the sleep-unpermitted automatic driving, evasion to the non-legal route is permitted.

7. The vehicle control device according to claim 1, wherein the at least one of the circuit and the processor is further configured to cause the vehicle control device to:

to identify an environment in which the vehicle is traveling, wherein:

when the obstacle is identified the identified avoidance measure is passing without stopping at a stop line; and when the identified avoidance measure is the passing without stopping at the stop line, on a basis of an identification of absence of an obstacle within a predetermined range from the stop line, the passing without stopping at the stop line is permitted.

8. The vehicle control device according to claim 7, wherein the at least one of the circuit and the processor is further configured to cause the vehicle control device to:

the passing without stopping at the stop line is permitted, a speed of the vehicle to a prescribed value or less before the vehicle reaches the stop line and causes the vehicle to travel at the speed of the prescribed value or less while the vehicle is crossing the stop line.

9. The vehicle control device according to claim 7, wherein:

an approach of an emergency vehicle to the vehicle is identified as the obstacle which prevents the vehicle from traveling;

when the approach of the emergency vehicle to the vehicle is identified as the obstacle, the identified avoidance measure is the passing without stopping at the stop line; and when the identified avoidance measure is the passing without stopping at the stop line, the passing without stopping at the stop line is permitted on the basis of the identification of absence of an obstacle within a predetermined range from the stop line.

10. The vehicle control device according to claim 7, wherein the at least one of the circuit and the processor is further configured to cause the vehicle control device to:

cause, when the passing without stopping at the stop line is permitted, a notification to be made to a driver of the vehicle to encourage peripheral monitoring.

11. The vehicle control device according to claim 7, wherein the at least one of the circuit and the processor is further configured to cause the vehicle control device to:

identify a state of a driver of the vehicle, wherein:

when the identified avoidance measure is the passing without stopping at the stop line, the passing without stopping at the stop line is permitted on a condition that the absence of an obstacle within the predetermined range from the stop line is identified and that the driver performing the peripheral monitoring is identified.

12. The vehicle control device according to claim 1, wherein the at least one of the circuit and the processor is further configured to cause the vehicle control device to:

cause, when the avoidance based on the deviant measure is permitted, a notification that the avoidance based on the deviant measure is to be performed to be made to a vehicle interior of the vehicle; and cause, when the avoidance based on the deviant measure is permitted, a notification that the avoidance based on the deviant measure is to be performed to be made to the outside of the vehicle interior of the vehicle.

13. A vehicle control device used on in a vehicle that performs automatic driving without monitoring obligation, which is automatic driving without peripheral monitoring obligation, the vehicle control device comprising:

at least one of (i) a circuit and (ii) a processor with a memory storing computer program code executable by the processor, the at least one of the circuit and the processor configured to cause the vehicle control device to:

identify a target situation in which it is set in advance that, during the automatic driving without monitoring obligation, the vehicle preferably performs deviant driving which is driving outside a scope of traffic regulations or traffic manners;

permit, during the automatic driving without monitoring obligation, when the target situation is identified, the deviant driving according to the target situation;

identify an environment in which the vehicle is traveling;

perform acceleration/deceleration control and steering control for the vehicle and control at least one of a speed, a steering angle, or a braking force of the vehicle to execute the deviant driving according to the target situation when the deviant driving is permitted;

wherein:

when the obstacle is identified, the identified avoidance measure is passing without stopping at a stop line;

when the identified avoidance measure is the passing without stopping at the stop line, on a basis of an identification of absence of an obstacle within a predetermined range from the stop line, the passing without stopping at the stop line is permitted; and the at least one of the circuit and the processor is further configured to cause the vehicle control device to control, when the passing without stopping at the stop line is permitted, the speed of the vehicle to a prescribed value or less before the vehicle reaches the stop line and causes the vehicle to travel at the speed of the prescribed value or less while the vehicle is crossing the stop line.

14. The vehicle control device according to claim 13, wherein the at least one of the circuit and the processor is further configured to cause the vehicle control device to:

identify, as the target situation, a fact that a vehicle driving ahead of the vehicle is performing automatic driving; and during the automatic driving without monitoring obligation, when the target situation is identified, an inter-vehicle distance is set between the vehicle and a driving-ahead vehicle to a value less than a threshold set in advance as the scope of the traffic manners.

15. The vehicle control device according to claim 13, wherein the identified target situation is a fact that a speed of a peripheral vehicle around the vehicle is in excess of a speed limit determined by the traffic regulations; and during the automatic driving without monitoring obligation, when the target situation is identified, a speed of the vehicle is permitted to match the speed of the peripheral vehicle even when the speed limit is exceeded.

16. The vehicle control device according to claim 13, wherein:

the identified target situation in which it is set in advance that traveling a wrong way in a section determined to have one-way traffic by the traffic regulations is preferable; and during the automatic driving without monitoring obligation, when the target situation is identified, the vehicle is permitted to travel the wrong way in the section determined to have one-way traffic by the traffic regulations.

17. A vehicle control method usable in a vehicle that performs automatic driving without monitoring obligation, which is automatic driving without peripheral monitoring obligation, the vehicle control method comprising steps to be performed by at least one processor, the steps being:

identifying an obstacle which prevents the vehicle from traveling;

identifying, when the obstacle is identified in the obstacle identification step, an avoidance measure that allows the vehicle to avoid the obstacle;

permitting, during the automatic driving without the monitoring obligation, on a basis of a fact that the identified avoidance measure identified is a deviant measure outside a scope of traffic regulations, avoidance based on the deviant measure; and performing acceleration/deceleration control and steering control for the vehicle;

wherein:

when the obstacle is identified, the identified avoidance measure is an avoidance route which is a route that allows the vehicle to avoid the obstacle;

evasion to the non-legal route is permitted during the automatic driving without the monitoring obligation on a basis of the identified avoidance route being a non-legal route outside the traffic regulations which is included in the deviant measure; and the steps further include causing the vehicle control device to control at least one of a speed, a steering angle, or a braking force of the vehicle so as to execute the avoidance based on the deviant measure when the avoidance based on the deviant measure is permitted.

18. A vehicle control method usable in a vehicle that performs automatic driving without monitoring obligation, which is automatic driving without peripheral monitoring obligation, the vehicle control method comprising steps to be performed by at least one processor, the steps being:

identifying a target situation in which it is set in advance that, during the automatic driving without monitoring obligation, the vehicle preferably performs deviant driving which is driving outside a scope of traffic regulations or traffic manners;

permitting, during the automatic driving without monitoring obligation, when the target situation is identified, the deviant driving according to the target situation;

identifying an environment in which the vehicle is traveling; and performing acceleration/deceleration control and steering control for the vehicle and controlling at least one of a speed, a steering angle, or a braking force of the vehicle to execute the deviant driving according to the target situation when the deviant driving is permitted;

wherein:

when the obstacle is identified, the identified avoidance measure is passing without stopping at a stop line;

when the identified avoidance measure is the passing without stopping at the stop line, on a basis of an identification of absence of an obstacle within a predetermined range from the stop line, the passing without stopping at the stop line is permitted; and the steps further include causing the vehicle control device to control, when the passing without stopping at the stop line is permitted, the speed of the vehicle to a prescribed value or less before the vehicle reaches the stop line and causes the vehicle to travel at the speed of the prescribed value or less while the vehicle is crossing the stop line.

19. A vehicle control device used in a vehicle that performs automatic driving without monitoring obligation, which is automatic driving without peripheral monitoring obligation, the vehicle control device comprising:

at least one of (i) a circuit and (ii) a processor with a memory storing computer program code executable by the processor, the at least one of the circuit and the processor configured to cause the vehicle control device to:

identity an obstacle which prevents the vehicle from traveling;

identify, when the obstacle is identified, an avoidance measure which that allows the vehicle to avoid the obstacle;

permit, during the automatic driving without monitoring obligation, an avoidance based on a deviant measure on a basis of a fact that the identified avoidance measure identified is a deviant measure outside a scope of traffic regulations; and a identify an environment in which the vehicle is traveling;

wherein:

when the obstacle is identified, the identified avoidance measure is passing without stopping at a stop line;

when the identified avoidance measure is the passing without stopping at the stop line, on a basis of an identification of absence of an obstacle within a predetermined range from the stop line, the passing without stopping at the stop line is permitted; and the at least one of the circuit and the processor is further configured to control, when the passing without stopping at the stop line is permitted, a speed of the vehicle to a prescribed value or less before the vehicle reaches the stop line and causes the vehicle to travel at the speed of the prescribed value or less while the vehicle is crossing the stop line.

\* \* \* \* \*